(12) United States Patent
Rasschaert et al.

(10) Patent No.: US 10,394,050 B2
(45) Date of Patent: Aug. 27, 2019

(54) 3D PRINTED EYEWEAR FRAME WITH INTEGRATED HINGE AND METHODS OF MANUFACTURE

(71) Applicant: MATERIALISE N.V., Leuven (BE)

(72) Inventors: Jolien Rasschaert, Leuven (BE); Philippe Schiettecatte, Leuven (BE); Willem Jan Verleysen, Leuven (BE); Roman Plaghki, Leuven (BE); Dries Vandecruys, Leuven (BE); Toon Roels, Leuven (BE)

(73) Assignee: Materialise N.V., Leuven (BE)

( * ) Notice: Subject to any disclaimer, the term of this patent is extended or adjusted under 35 U.S.C. 154(b) by 107 days.

(21) Appl. No.: 15/510,108

(22) PCT Filed: Sep. 23, 2015

(86) PCT No.: PCT/US2015/051781
§ 371 (c)(1),
(2) Date: Mar. 9, 2017

(87) PCT Pub. No.: WO2016/049226
PCT Pub. Date: Mar. 31, 2016

(65) Prior Publication Data
US 2017/0248802 A1    Aug. 31, 2017

Related U.S. Application Data

(60) Provisional application No. 62/054,756, filed on Sep. 24, 2014.

(51) Int. Cl.
*G02C 5/22* (2006.01)
*B29D 12/02* (2006.01)
(Continued)

(52) U.S. Cl.
CPC .......... *G02C 5/2254* (2013.01); *B29C 64/129* (2017.08); *B29C 64/153* (2017.08);
(Continued)

(58) Field of Classification Search
CPC .............. G02C 13/003; G02C 2200/14; G02C 2200/22; G02C 2200/24; G02C 2200/26; G02C 5/2227; G02C 5/2272; G02C 5/22; G02C 5/2236; G02C 5/2263; G06F 17/50; G06F 19/00; G06F 2217/12
(Continued)

(56) References Cited

U.S. PATENT DOCUMENTS

| 6,425,664 B1* | 7/2002 | Liu .......................... G02C 3/04 24/3.3 |
| 2015/0061166 A1* | 3/2015 | Van De Vrie ........ G02C 13/003 264/1.7 |

FOREIGN PATENT DOCUMENTS

| EP | 2352052 A1 | 8/2011 |
| WO | 93/22705 A1 | 11/1993 |
| WO | 2013/149891 A1 | 10/2013 |

OTHER PUBLICATIONS

International Search Report, PCT/US2015/051781, dated Sep. 23, 2015, European Search Authority.

* cited by examiner

*Primary Examiner* — Hung X Dang
(74) *Attorney, Agent, or Firm* — Patterson + Sheridan, LLP

(57) ABSTRACT

Disclosed is a 3D printed eyewear frame having an integrated hinge. Advantageously, the integrated hinge assembly is a crossed spring hinge. Methods of manufacturing a 3D printed eyewear frame are likewise provided.

16 Claims, 16 Drawing Sheets

(51) Int. Cl.
| | |
|---|---|
| *B33Y 80/00* | (2015.01) |
| *B33Y 50/00* | (2015.01) |
| *B33Y 10/00* | (2015.01) |
| *B33Y 50/02* | (2015.01) |
| *G02C 5/00* | (2006.01) |
| *G02C 5/14* | (2006.01) |
| *B29C 64/129* | (2017.01) |
| *B29C 64/153* | (2017.01) |
| *B29K 75/00* | (2006.01) |
| *B29K 79/00* | (2006.01) |
| *B29K 105/16* | (2006.01) |

(52) U.S. Cl.
CPC .............. *B29D 12/02* (2013.01); *B33Y 10/00* (2014.12); *B33Y 50/00* (2014.12); *B33Y 50/02* (2014.12); *B33Y 80/00* (2014.12); *G02C 5/008* (2013.01); *G02C 5/146* (2013.01); *G02C 5/2272* (2013.01); B29K 2075/00 (2013.01); B29K 2079/08 (2013.01); B29K 2105/16 (2013.01); G02C 2200/14 (2013.01); G02C 2200/22 (2013.01)

(58) Field of Classification Search
USPC ............................... 351/158, 41, 153; 16/228
See application file for complete search history.

3D PRINTED EYEWEAR FRAME WITH INTEGRATED HINGE AND METHODS OF MANUFACTURE

CROSS-REFERENCE TO RELATED APPLICATION(S)

This application claims the benefit of U.S. Provisional Patent Application No. 62/054,756, filed Sep. 24, 2014, the entire contents of which are hereby incorporated by reference.

BACKGROUND OF THE INVENTION

Field of the Invention

The present invention relates to eyewear and more specifically to 3D printed eyewear.

Description of the Related Technology

Eyewear, such as sunglasses or spectacles, typically comprise a front frame, end pieces attached to the front frame, temples which extend out from the end pieces and over the ears of the wearer, and a pair of hinges for attaching the temples to the end pieces. Conventionally, the front frame comprises a pair of rims each holding a lens and attached by a bridge and/or brace. The rims are typically attached to the hinge by an end piece. More recently, the front frame comprises a top member which holds a single unitary lens. Typically, the pair of hinges pivotally interconnects the front frame and the temples. Each hinge typically includes a tang, a clevis having a pair of spaced apart and generally parallel clevis members, and a pivot pin. The tang is provided with a pivot pin through hole and the clevis members are provided with a pair of axially aligned pivot pin through holes. The clevis members are placed around the tang, the through holes axially aligned and the connector pin is inserted into the aligned through holes to pivotally interconnect the tang and clevis. A "barrel type" eyeglass hinge is similar except that it contains multiple tangs interleaved with devises. Conventionally, the pair of hinges is made in another material than the frame.

In recent years, numerous improvements have been made in eyewear design and production, which have produced increasingly lightweight, comfortable, and attractive products. However, these product improvements have exposed a number of problems with traditional eyewear designs. First, many eyewear products are very delicate, have multiple small components, and require sophisticated tools or custom parts for repair or assembly. Second, the delicate components inevitably break after extended use, and the repairs are time consuming, expensive, or inconvenient for the user. Third, for a given set of eyeglasses frames, it is often difficult, expensive, or impossible to customize the eyeglasses for a given user. In addition, repairs to damaged eyeglasses can often not be made by the end user, necessitating a visit to an optician, ophthalmologist, or optometrist.

A major problem with many eyeglasses designs is the need for multiple fasteners such as screws, pins, or small bolts. These fasteners may be located at hinge points between the eyeglasses temple arm and temple arm hinge block or at various positions on the eyeglasses rim. In some cases, multiple fastener types or sizes are used on the same pair of eyeglasses. Furthermore, these fasteners are often not easily replaced through a vender's stock and often require custom orders to make repairs.

Fasteners may be used both on eyeglasses rims and eyeglasses hinges. When used on eyeglasses rims, the fasteners may help secure a lens in place, connect the rim to another portion of the eyeglass, or hold multi-component parts together. In any case, the fastener, whether it be a screw, pin, or bolt design, is subject to back-out after extended wear. When this occurs, the fastener will often be lost, and the product will be rendered useless until a repair is made.

Fasteners are also used for eyeglasses hinges, for which numerous designs exist. Some designs require threaded fasteners such as screws or small bolts. Others require threadless fasteners such as pins. Some designs also employ an adhesive, washers, or friction-fit materials. Regardless, with all of these hinge designs, the screw, bolt, or pin risks backing out of the socket in the hinge or other frame section, rendering the eyeglasses unwearable and potentially requiring the purchase of new parts, the use of special tools, or a consultation with an optician to make repairs.

Another problem with eyeglasses hinges is that they are sometimes subject to relatively severe stress due to accidental or intentional misuse. Eyeglasses are commonly used during recreational and outdoor sports and activities. In addition to functional requirement, lightweight, attractive outer appearance, high durability and safety are also important when one is considering to buy eyeglasses. Traditional eyeglasses hinges will often break or become distorted under sufficient stress. Broken eyeglasses cannot be worn, and distorted eyeglasses may fit improperly. With most current designs, repairs may require significant training, the purchase of replacement parts, or the use of unsightly materials such as tape or glue.

Hinges in eyewear frames can be incorporated by an assembly process as described above, wherein a part of the hinge is made of a material other than the frame itself; or alternatively, the hinge can be an integral part of the framework and thus produced by the same production technology (and) as the frame. With the advent of 3D printing technology, it is now possible to create eyewear designs that are capable of customization and personalization. Manufacturing costs may be lessened by employing lower manufacturing materials; however, these same materials are subject to performance problems caused by stress, wear, and tear. Thus, there remains a need for eyewear and methods of manufacturing eyewear which optimize design possibilities while reducing the shortcomings and performance issues of 3D printed materials.

SUMMARY

The present invention is directed to improved systems and methods for design and manufacture of 3D printed eyewear frames with integrated hinges, which overcome the aforementioned deficiencies.

The use of 3D printing technology in the manufacturing of eyewear frames is increasingly popular. The ability of the technology to print, in an economic way, customized frames is a major advantage of 3D printing. This application discloses eyewear hinges manufactured with and integrally connected to the frame. Also disclosed are 3D manufactured eyewear frames having a front frame, an end piece integrally attached to the front frame, a temple integrally attached to the end piece and at least one crossed-spring hinge assembly disposed between the end piece and the temple, where the crossed-spring hinge has a first leg and a second leg. Advantageously, the first and second leg may be arranged to form an x-shape.

Advantageously, some embodiments of the invention describe hinges, fully integrated without the need for screws, pins, or bolts, for eyewear frames, made with the 3D printing technologies. The hinge possesses various features, and printing instructions, each of them reflecting the desired performance.

Further advantageously, some embodiments of the present invention provide the possibility to open and close the eyewear repeatedly without damaging the frame.

Another advantage of some of the embodiments of the present invention is durable flexibility: the combination of building orientation, relative position of the temples, and the presence of cross hinges avoids the build-up of excessive stresses in certain zones. Absence of local stress results in a longer lifetime for the eyewear.

Another advantage of some embodiments of the present invention is the comfort (tight fit & stability) when wearing the eyewear. In an "open" position, the crossed hinges produce a predetermined angle e.g., 45°, providing some inwards moving forces, so that the eyewear frame is held tightly against the wearers head. The magnitude of this force may also be predetermined, as the (undesired) sideward flexibility may be fine-tuned by the actual thickness of the elements of the cross hinge. In addition, the number of crossed hinges may be predetermined, and the way they are connected may be selected before manufacture.

Another advantage of some embodiments of the present invention is the ease of folding together of the frame, and storing it in a case. A predetermined angle between the temples, or frame legs, and the front frame ensures that no excessive force is needed to fold the temples inward. As the folded position is not the equilibrium position, some force may be needed to keep the temples in the folded position. An additional locking feature may help to maintain this position.

Another advantage of some embodiments of the present invention is the economically viable production of the eyewear. Yet another advantage of some embodiments of the present invention is the fact that the eyewear hinges may be made of the same material as the frame by the same production technology, and are integrally connected to the frame. Producing 3D printed eyewear hinges made of the same material as the rest of the frame is particularly challenging due to the limited availability of elastic materials.

In one embodiment, an eyewear frame is disclosed. This eyewear frame may be made using a 3D printing process, said frame comprising: a front frame; an end piece integrally attached to said front frame; at least one temple integrally attached to said end piece; and at least one crossed-spring hinge disposed between said end piece and said temple, wherein the crossed-spring hinge comprises a first hinge leg and a second hinge leg, wherein said first and second leg form an x-shape.

In another embodiment, the frame may be constructed of a material selected from the group consisting of polyurethane, polyamide, polyamide with additives such as glass or metal particles, resorbable materials such as polymer-ceramic composites, aluminium, cobalt chrome, stainless steel, maranging steel, nickel alloy, titanium, alumide and carbonmide.

In another embodiment, the eyewear frame further comprises a securing element.

In another embodiment, the securing element is selected from a group consisting of an anchor, an incision, and a hook.

In another embodiment, at least one temple is biased at an angle of less than 90 degrees with respect to the front frame.

In yet another embodiment, at least one temple is biased to an in-rest position between 30 degrees and about 45 degrees with respect to the front frame.

In another embodiment, the eyewear frame further comprises a range limiter, wherein said range limiter prevents the opening of said temple at an angle greater than a predefined angle with respect to the front frame.

In yet another embodiment, another eyewear frame is disclosed. The eyewear frame is made using a 3D printing process, said frame comprising: a front frame; an end piece integrally attached to said front frame; a temple integrally attached to said end piece; and at least one crossed-spring hinge disposed between said end piece and said temple, wherein the crossed-spring hinge comprises a first leg and a second leg, wherein said first and second leg are in parallel.

In another embodiment, a method of manufacturing eyewear is disclosed. The method comprises: defining design features of said eyewear; selecting the type of integrated cross-spring hinge to be used in said eyewear; defining said eyewear building orientation; compiling 3D printing instructions for said eyewear; manufacturing and finishing said eyewear using 3D printing technology.

In another embodiment, the crossed spring hinge is produced in a building orientation in which a plane formed by an x-axis and a y-axis of a 3D printing machine is parallel with a two-dimensional plane formed by two temples.

In another embodiment, the eyewear frame is constructed of at least one of the following materials: polyurethane, polyamide, polyamide with additives such as glass or metal particles, resorbable materials such as polymer-ceramic composites, aluminium, cobalt chrome, stainless steel, maranging steel, nickel alloy, titanium, alumide and carbonmide.

In another embodiment, the securing element is selected from a group consisting of an anchor, an incision, and a hook.

In another embodiment, the method further comprises: defining at least one feature of the crossed spring hinge system; determining if more than one crossed spring hinge is to be used; determining if a passive connector is to be used.

BRIEF DESCRIPTION OF THE DRAWINGS

These and other features, aspects, and advantages of the invention disclosed herein are described below with reference to the drawings of preferred embodiments, which are intended to illustrate and not to limit the invention. Additionally, from figure to figure, the same reference numerals have been used to designate the same components of an illustrated embodiment. The following is a brief description of each of the drawings.

DETAILED DESCRIPTION OF CERTAIN INVENTIVE EMBODIMENTS

Figure 1:
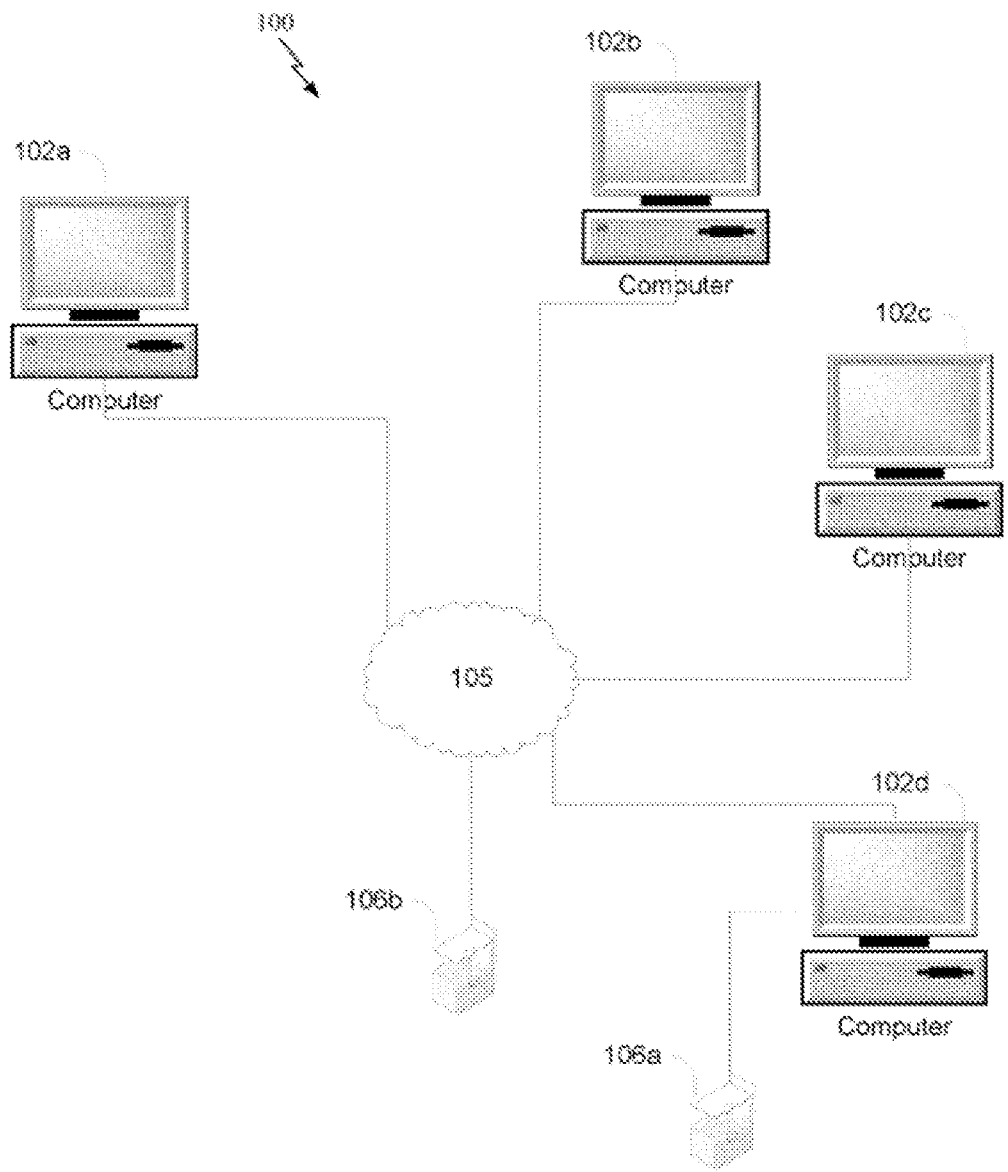
FIG. 1 is a block diagram which shows a high level view of a system that may be used to design and manufacture three dimensional (3D) objects.

The following description and the accompanying figures are directed to certain specific embodiments. The embodiments described in any particular context are not intended to limit this disclosure to the specified embodiment or to any particular usage. Those of skill in the art will recognize that the disclosed embodiments, aspects, and/or features are not limited to any particular embodiments. The devices, systems, and methods described herein may be designed and optimized for use in a variety of fields.

Reference throughout this specification to "one embodiment," "an embodiment," "some aspects," "an aspect," or "one aspect" means that a particular feature, structure or characteristic described in connection with the embodiment or aspect is included in at least one embodiment of the present invention. Thus, appearances of the phrases "in one embodiment," "in an embodiment," "some aspects," "an aspect," or "one aspect" in various places throughout this specification are not necessarily all referring to the same embodiment or aspects, but may. Furthermore, the particular features, structures or characteristics may be combined in any suitable manner, as would be apparent to a person skilled in the art from this disclosure, in one or more embodiments or aspects. Furthermore, while some embodiments or aspects described herein include some but not other features included in other embodiments or aspects, combinations of features of different embodiments or aspects are meant to be within the scope of the invention, and form different embodiments or aspects, as would be understood by those in the art. For example, in the appended claims, any of the features of the claimed embodiments or aspects can be used in any combination.

The invention is based in part on the discovery of a hinge which is particularly well suited for implementation with 3D printed eyewear frames. As will be described in greater detail below, the hinge and eyewear frames comprising the hinge overcome many of the drawbacks of prior eyewear designs. The hinge and eyewear frame having the disclosed hinge assembly provide the ability to open and close the temples of the eyewear frame repeatedly without damaging the eyewear frame or stressing/stretching the hinge. Additionally, the 3D printed eyewear frames having the hinge assembly described herein offer comfort (enhanced, tight fit and greater stability) when the eyewear frames are being worn and when removed, the eyewear frames are easily folded together. Yet another advantage of the 3D printed eyewear frames with cross-spring hinges is the ability to produce the frames economically by harnessing 3D printing technology while allowing for customization and creativity with respect to design.

Thus, in one aspect, eyewear frames having a cross-spring hinge assembly are manufactured utilizing conventional 3D printing technology. A skilled artisan will readily appreciate that the techniques and methods described herein may be performed using various additive manufacturing and/or three dimensional (3D) printing systems. Similarly, the products formed by the techniques and methods described herein may be formed using various additive manufacturing and/or 3D printing systems and materials. By way of background, additive manufacturing or 3D printing techniques start from a digital representation of the 3D object to be formed. Generally, the digital representation is divided into a series of cross-sectional layers, which are overlaid to form the object as a whole. The layers represent the 3D object, and may be generated using additive manufacturing modeling software executed by a computing device. For example, the software may include computer aided design and manufacturing (CAD/CAM) software. Information about the cross-sectional layers of the 3D object may be stored as cross-sectional data. An additive manufacturing or 3D printing machine or system utilizes the cross-sectional data for the purpose of building the 3D object on a layer by layer basis. Accordingly, additive manufacturing or 3D printing allows for fabrication of 3D objects directly from computer generated data of the objects, such as computer aided design (CAD) files. Additive manufacturing or 3D printing provides the ability to quickly manufacture both simple and complex parts without tooling and without the need for assembly of different parts.

Examples of additive manufacturing and/or three dimensional printing techniques include stereolithography, selective laser sintering, fused deposition modeling (FDM), droplet jetting, technologies foil-based techniques, and the like. Stereolithography ("SLA"), for example, utilizes a vat of liquid photopolymer "resin" to build an object a layer at a time. Each layer includes a cross-section of the object to be formed. First, a layer of resin is deposited over the entire building area. For example, a first layer of resin may be deposited on a base plate of an additive manufacturing system. An electromagnetic ray then traces a specific pattern on the surface of the liquid resin. The electromagnetic ray may be delivered as one or more laser beams which are computer-controlled. Exposure of the resin to the electromagnetic ray cures, or solidifies, the pattern traced by the electromagnetic ray, and causes it to adhere to the layer below. After a coat of resin has been had been polymerized, the platform descends by a single layer thickness and a subsequent layer of liquid resin is deposited. A pattern is traced on each layer of resin, and the newly traced layer is adhered to the previous layer. A complete 3D object may be formed by repeating this process. The solidified 3D object may be removed from the SLA system and processed further in post-processing.

Selective laser sintering ("SLS") is another additive manufacturing technique that uses a high power laser, or another focused energy source, to fuse small fusible particles of solidifiable material. In some embodiments, selective laser sintering may also be referred to as selective laser melting. In some embodiments, the high power laser may be a carbon dioxide laser for use in the processing of, for example, polymers. In some embodiments, the high power laser may be a fiber laser for use in the processing of, for example, metallic materials. Those of skill in the art will recognize that, in some embodiments, other types of high power lasers may be used depending on the particular application. The particles may be fused by sintering or welding the particles together using the high power laser. The small fusible particles of solidifiable material may be made of plastic powders, polymer powders, metal (direct metal laser sintering) powders, or ceramic powders (e.g., glass powders, and the like). The fusion of these particles yields an object that has a desired 3D shape. For example, a first layer of powdered material may be deposited on a base plate. A laser may be used to selectively fuse the first layer of powdered material by scanning the powdered material to create and shape a first cross-sectional layer of the 3D object. After each layer is scanned and each cross-sectional layer of the object is shaped, the powder bed may be lowered by one layer of thickness, a new layer of powdered material may be applied on top of the previous layer, and the process may be repeated until the build is completed and the object is generated. The cross-sectional layers of the 3D object may be generated from a digital 3D description of the desired object. The 3D description may be provided by a CAD file or from scan data input into a computing device. The solidified 3D object may be removed from the SLS system and processed further in post-processing.

Suitable additive manufacturing or 3D printing systems for use herein include, but are not limited to, various implementations of SLA and SLS technology. Materials used may include, but are not limited to, high performance polymers such as polyurethane, thermoplastic polyurethane, polypropylene, polyethylene, polyamide, polyamide with additives such as glass or metal particles, including block-copolymers, resorbable materials such as polymer-ceramic composites, and polyacrylamide, polystyrene, polycarbonate, acrylonitrile butadiene styrene (ABS), polyoxymethylene (POM), polyvinyl chloride, polyesters. Examples of commercially available materials include: DSM Somos® series of materials 7100, 8100, 9100, 9420, 10100, 11100, 12110, 14120 and 15100 from DSM Somos; Accura Plastics and/or Resins, DuraForm, CastForm, Laserform and VisiJet line of materials from 3-D-Systems; Aluminium, CobaltChrome and Stainless Steel materials; Maranging Steel; Nickel Alloy; Titanium; the PA line of materials, PrimeCast and PrimePart materials and Alumide and CarbonMide from EOS GmbH; the PA product line of materials from Arkema, comprising Orgasol® Invent Smooth, Rilsan® Invent Natural, Rilsan® Invent Black; Tusk Somos® SolidGrey3000, TuskXC2700T, Tusk2700 W, Poly1500, Xtreme, NanoTool, Protogen White, WaterClear; polyethylene, (met)acrylates, and epoxies.

While many 3D printing machines print objects in one material, some 3D printing technologies allow for printing in more than one material (multimaterial). These technologies are typically the ones relying on the principle of selective deposition of material as opposed to the ones relying on selective polymerization or melting in a bed/vat). Several examples of this technology include: FDM, Polyjet, Arburg Freefrom technology, Binderjetting technologies like Voxeljet and Z-corp, where a binding agent is jetted on a powder bed, Stratasys product line: Dimension 1200es, Dimension Elite, Fortus 250mc, Objet24, Objet30 Pro, Objet Eden260V, Objet Eden350/350V, Objet Eden500V, Objet260 Connex, Objet350 Connex, Objet500 Connex, Objet500 Connex3; 3DSytems product line: ProJet® 3510 SD, ProJet® 3510 HD, ProJet® 3510 HDPlus, ProJet® 3500 HDMax, ProJet® 5000, ProJet® 5500X, ProJet® 6000 SD, ProJet® 7000 SD, ProJet® 6000 HD, ProJet® 7000 HD, iPro™ 8000, iPro™ 8000 MP, ProJet® 6000 HD, ProJet® 7000 HD, ProX™ 950, ProX™ 500, sPro™ 140, sPro™ 230, sPro™ 60 HD, ProX™ 100, ProX™ 100 Dental, ProX™ 200, ProX™ 200 Dental, ProX™ 300, VX 1000 3D Printer for Casting Patterns, VX 500 3D Printer for Casting Patterns. Technologies able to print in multimaterial may make enhanced use of the embodiments of this invention by having a hinge printed in a flexible material, and the frame in a more rigid material.

Various aspects will now be described with reference to specific forms or embodiments selected for the purpose of illustration. It will be appreciated that the spirit and scope of the objects disclosed herein is not limited to the selected embodiments. Moreover, it is to be noted that the figures provided herein are not drawn to any particular proportion or scale, and that many variations may be made to the illustrated embodiments. Brief introductions to some of the features, which may be common to embodiments disclosed herein, are now described.

FIGS. 1-4 provide an example of general systems and method which may be used to perform additive manufacture of 3D objects including eyewear frames. Referring initially to FIG. 1, an example of a system 100 for designing and manufacturing 3D objects and/or products is provided. The system 100 may be configured to support the techniques described herein. For example, the system 100 may be configured to design and generate a 3D object, such as eyewear or any one or more of those described in further detail below. In some embodiments, the system 100 may include one or more computers 102a-102d. The computers 102a-102d may take various forms such as, for example, any workstation, server, or other computing device capable of processing information. The computers 102a-102d may be connected by a computer network 105. The computer network 105 may be the Internet, a local area network, a wide area network, or some other type of network. The computers may communicate over the computer network 105 via any suitable communications technology or protocol. The computers 102a-102d may share data by transmitting and receiving information such as software, digital representations of 3D objections, commands and/or instructions to operate an additive manufacturing device, and the like.

The system 100 further may include one or more additive manufacturing devices 106a and 106b. These additive manufacturing devices may take the form of 3D printers or some other manufacturing device as known in the art. In the example shown in FIG. 1, the additive manufacturing device 106a is connected to the computer 102a. The additive manufacturing device 106a is also connected to computers 102a-102c via the network 105 which connects computers 102a-102d. Additive manufacturing device 106b is also connected to the computers 102a-102d via the network 105. A skilled artisan will readily appreciate that an additive manufacturing device such as devices 106a and 106b may be directly connected to a computer 102, connected to a computer 102 via a network 105, and/or connected to a computer 102 via another computer 102 and the network 105.

Although a specific computer and network configuration is described in FIG. 1, a skilled artisan will also appreciate that the additive manufacturing techniques described herein may be implemented using a single computer configuration which controls and/or assists the additive manufacturing device 106, without the need for a computer network.

Figure 2:
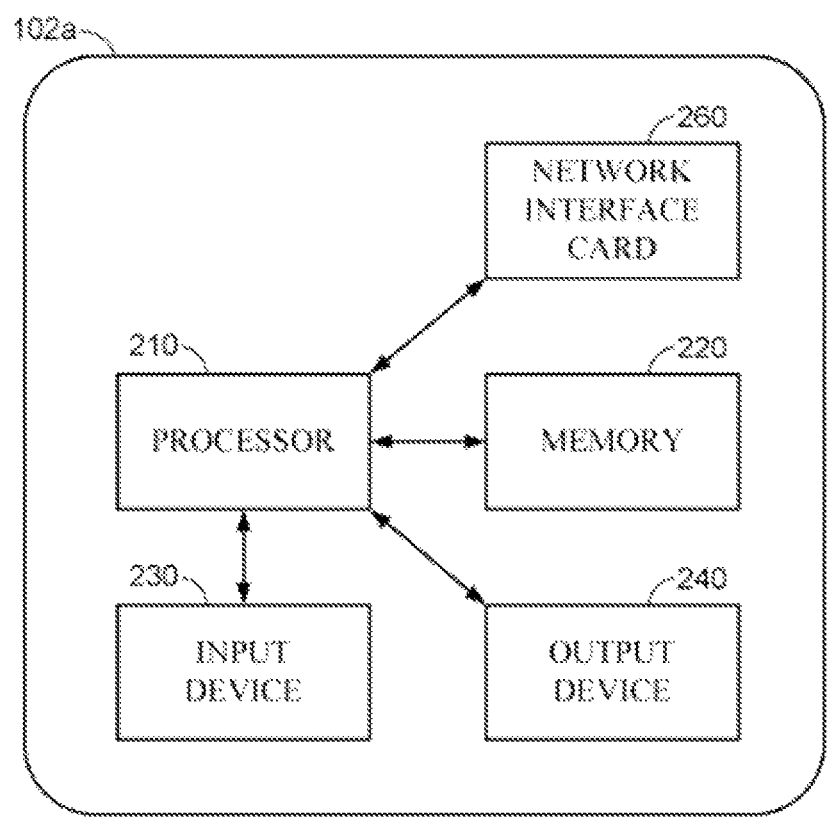
FIG. 2 is a functional block diagram of one example of a computer shown in FIG. 1.

Turning to FIG. 2, a more detailed view of computer 102a shown in FIG. 1 is provided. The computer 102a includes a processor 210. The processor 210 is in data communication with various computer components. These components may include a memory 220, an input device 230, and an output device 240. In certain embodiments, the processor may also communicate with a network interface card 260. Although described separately, it is to be appreciated that functional blocks described with respect to the computer 102a need not be separate structural elements. For example, the processor 210 and network interface card 260 may be embodied in a single chip or board.

The processor 210 may be a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 may be coupled, via one or more buses, to read information from or write information to memory 220. The processor may additionally, or in the alternative, contain memory, such as processor registers. The memory 220 may include processor cache, including a multi-level hierarchical cache in which different levels have different capacities and access speeds. The memory 220 may further include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 may also be coupled to an input device 230 and an output device 240 for, respectively, receiving input from and providing output to a user of the computer 102a. Suitable input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to a computer. The input device may also take the form of a touch screen associated with the display, in which case a user responds to prompts on the display by touching the screen. The user may enter textual information through the input device such as the keyboard or the touch-screen. Suitable output devices include, but are not limited to, visual output devices, including displays and printers, audio output devices, including speakers, headphones, earphones, and alarms, additive manufacturing devices, and haptic output devices.

The processor 210 further may be coupled to a network interface card 260. The network interface card 260 prepares data generated by the processor 210 for transmission via a network according to one or more data transmission protocols. The network interface card 260 may also be configured to decode data received via the network. In some embodiments, the network interface card 260 may include a transmitter, receiver, or both. Depending on the specific embodiment, the transmitter and receiver can be a single integrated component, or they may be two separate components. The network interface card 260, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3A:
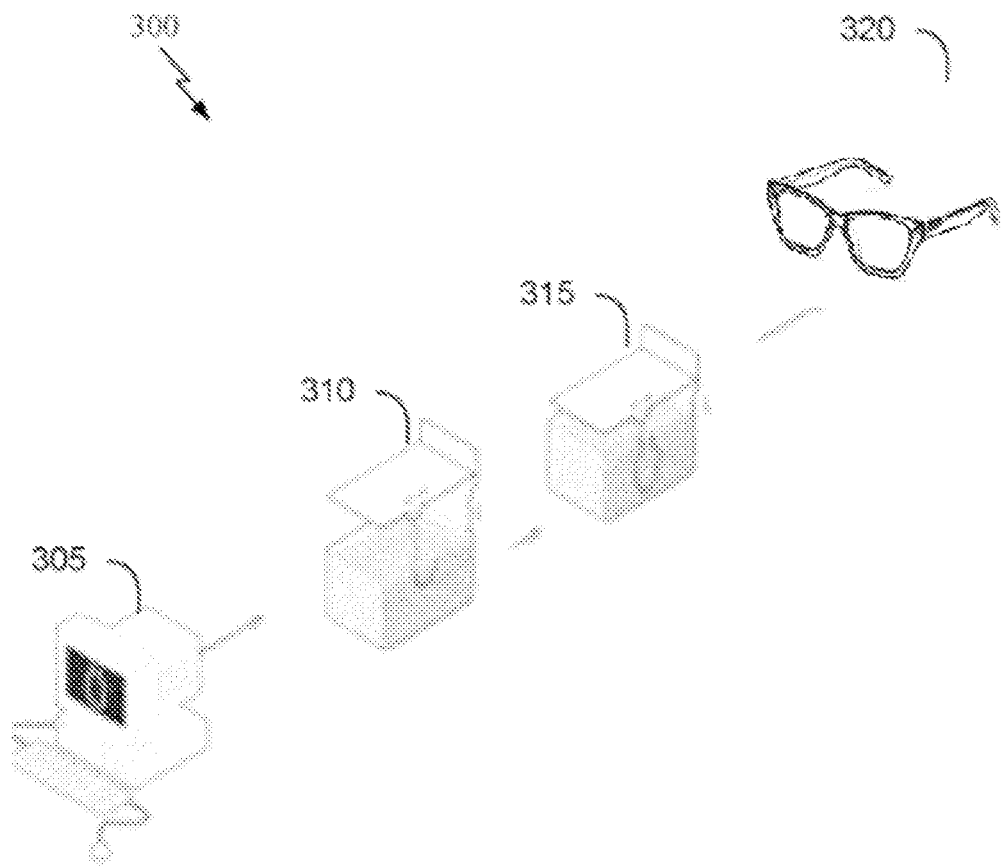
FIG. 3A is a high level example of a process for manufacturing a 3D object.

Using the devices described in connection with FIGS. 1 and 2 above, an additive manufacturing process may be employed to produce a 3D object or device. FIG. 3A is an illustration of one such process. In particular, FIG. 3A shows a general process 300 for manufacturing a 3D object, such as those that will be described in further detail below in connection with FIGS. 3B-13 below.

The process begins at step 305, where a digital representation of the 3D object to be manufactured is designed using a computer, such as the computer 102a. In some embodiments, a 2-D representation of the object may be used to create a 3D model of the object. Alternatively, 3D data may be input to the computer 102a for aiding in designing the digital representation of the 3D object. The process continues to step 310, where information is sent from the computer 102a to an additive manufacturing device, such as additive manufacturing device 106. Next, at step 315, the additive manufacturing device 106 begins manufacturing the 3D object by performing an additive manufacturing process using suitable materials. Suitable materials include, but are not limited to polypropylene, thermoplastic polyurethane, polyurethane, acrylonitrile butadiene styrene (ABS), polycarbonate (PC), PC-ABS, polyamide, polyamide with additives such as glass or metal particles, methyl methacrylate-acrylonitrile-butadiene-styrene copolymer, resorbable materials such as polymer-ceramic composites, and other similar suitable materials. In some embodiments, commercially available materials may be utilized. These materials may include: DSM Somos® series of materials 7100, 8100, 9100, 9420, 10100, 11100, 12110, 14120 and 15100 from DSM Somos; ABSplus-P430, ABSi, ABS-ESDI, ABS-M30, ABSM30i, PC-ABS, PC-ISO, PC, ULTEM 9085, PPSF and PPSU materials from Stratasys; Accura Plastic, DuraForm, CastForm, Laserform and VisiJet line of materials from 3D Systems; Aluminium, CobaltChrome and Stainless Steel materials; Maranging Steel; Nickel Alloy; Titanium; the PA line of materials, PrimeCast and PrimePart materials and Alumide and CarbonMide from EOS GmbH. Using the appropriate materials, the additive manufacturing device then completes the process at step 320, where the 3D object is generated.

Figure 3B:
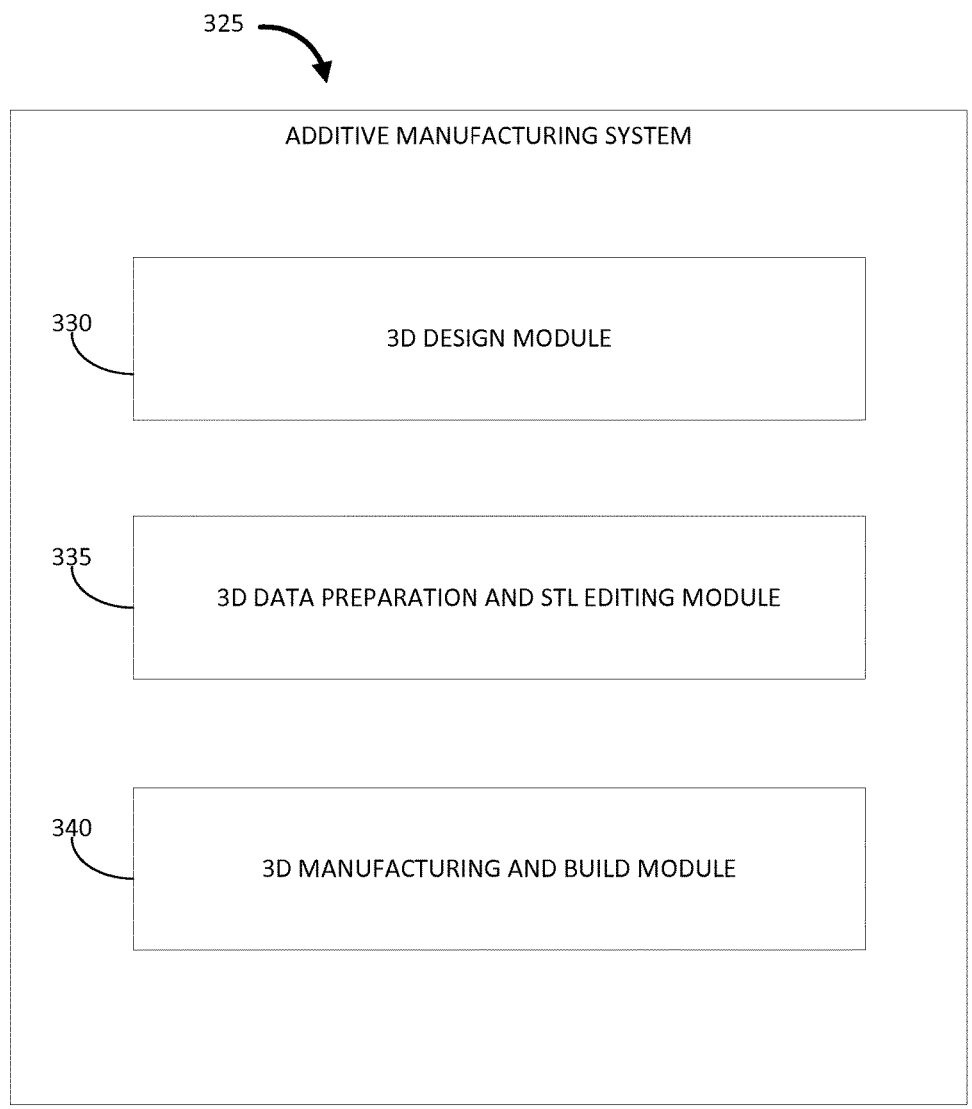
FIG. 3B is a high level block diagram of various functional aspects of an additive manufacturing system which may be used to practice various embodiments disclosed herein.

Turning to FIG. 3B, a block diagram showing various functional components of an additive manufacturing system 325 suitable for providing 3D printed eyewear frames with integrated hinges in the manufacturing process is presented. The additive manufacturing system 325 may comprise various modules which provide 3D printing functionality. In the example shown in FIG. 3B, the 3D manufacturing system 325 includes a 3D design module 330. The 3D design module is 330 typically takes the form of a collection of computer software and/or hardware that assists in the creation, modification, analysis, or optimization of a 3D printed design. The 3D design module 330 may include computer-aided design (CAD) software having 3D design and modeling capabilities.

The 3D manufacturing system 325 may also include a 3D data preparation and STL editing module 335. The 3D data preparation and STL editing module typically bridges the design and manufacturing process. The 3D data preparation and STL editing module may take various forms. In some embodiments, it may be specialized software configured to run on a special purpose or general-purpose computing device. In some embodiments, the 3D data preparation and STL editing module may be a software package such as Magics from Materialise of Leuven, Belgium.

The additive manufacturing system 325 may further include a 3D manufacturing and build module 340. The 3D manufacturing and build module 340 typically takes the form of hardware and/or software which controls the build process of a 3D printed object. In some embodiments, the 3D manufacturing and build module 340 may a build processor configured to control an additive printing device. In other embodiments, the 3D manufacturing and build module may include a software solution such as AutoFab from Materialise NV (Leuven, Belgium). The 3D manufacturing and build module may be configured to transfer generated build data to an additive manufacturing (AM) machine as build-ready slice data or alternatively as STL (STereoLithography) data, depending on the interface of the machine control software. The machine control software, which may be part of the build module 340, or provided separately, may translate the build data into the beam control program for the build process. The AM device may then manufacture the designed product layer by layer in the selected material.

Figure 3C:
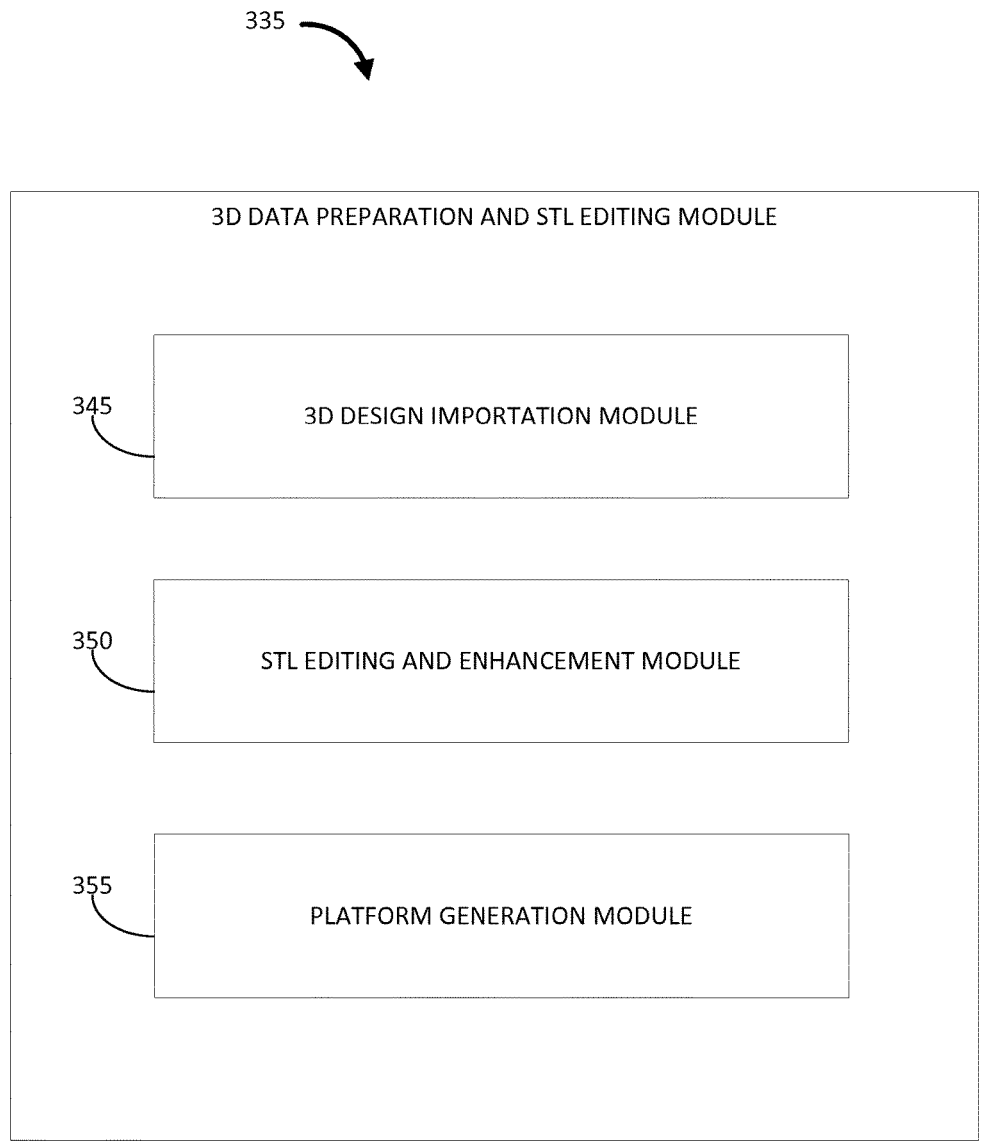
FIG. 3C is a block diagram providing a more detailed view of the 3D data preparation and STL editing module shown in FIG. 3B.

Turning now to FIG. 3C, the 3D data preparation and STL editing module 335 of FIG. 3B is shown in greater detail. The 3D data preparation and STL editing module 335 may comprise various sub-modules which are configured to execute various functions within the 3D data preparation and STL editing module 335. For example, the 3D data preparation and STL editing module 335 may include a 3D design importation module 345. The 3D design importation module 345 may include various processes and functions which are configured to import data from a CAD system into a 3D printable format such as STL, for example. Although the particular examples described herein are generally directed to STL formatted 3D models, a skilled artisan will readily appreciate that other 3D printing file formats could be used to practice one or more embodiments disclosed herein. These formats may include 3dmlw (3D Markup Language for Web), ACP (VA Software), VA (Virtual Architecture CAD file), Ashlar-Vellum Argon (3D Modeling), CCM (CopyCAD Model), CATProcess (CATIA V5 Manufacturing document), DWG (AutoCAD and Open Design Alliance applications, Autodesk Inventor Drawing file), EASM (SolidWorks eDrawings assembly file), GLM (KernelCAD model), IPN (Autodesk Inventor Presentation file), PRT—(NX, recently known as Unigraphics, Pro/ENGINEER Part, CADKEY Part), SCAD (OpenSCAD 3D part model), SCDOC (SpaceClaim 3D Part/Assembly), SLDASM (SolidWorks Assembly drawing), SLDPRT (SolidWorks 3D part model), TCW (TurboCAD for Windows 2D and 3D drawings), VS (Ashlar-Vellum Vellum Solids), or other formats.

The 3D data preparation and STL editing module 335 may also include an STL editing and enhancement module 350. The STL editing and enhancement module 350 may be configured to correct a 3D model before avoidable additional costs occur through erroneous production. For example, the editing and enhancement module 350 may be configured to allow a user to easily repair defects such as flipped triangles, bad edges, holds and the like. The editing and enhancement module may also be configured to allow a user to enhance the design file by adding features such as hollow parts, logos, and the like. In addition, a user may also apply textures using this module. Still further, the editing and enhancement module may provide support generation functionality.

The 3D data preparation and STL editing module 335 may further include a platform generation module 355. The platform generation module 355 may provide functionality which allows a user to prepare the platform for the manufacturing process by orienting the parts in an optimized way via nesting and other platform optimization techniques.

Figure 4:
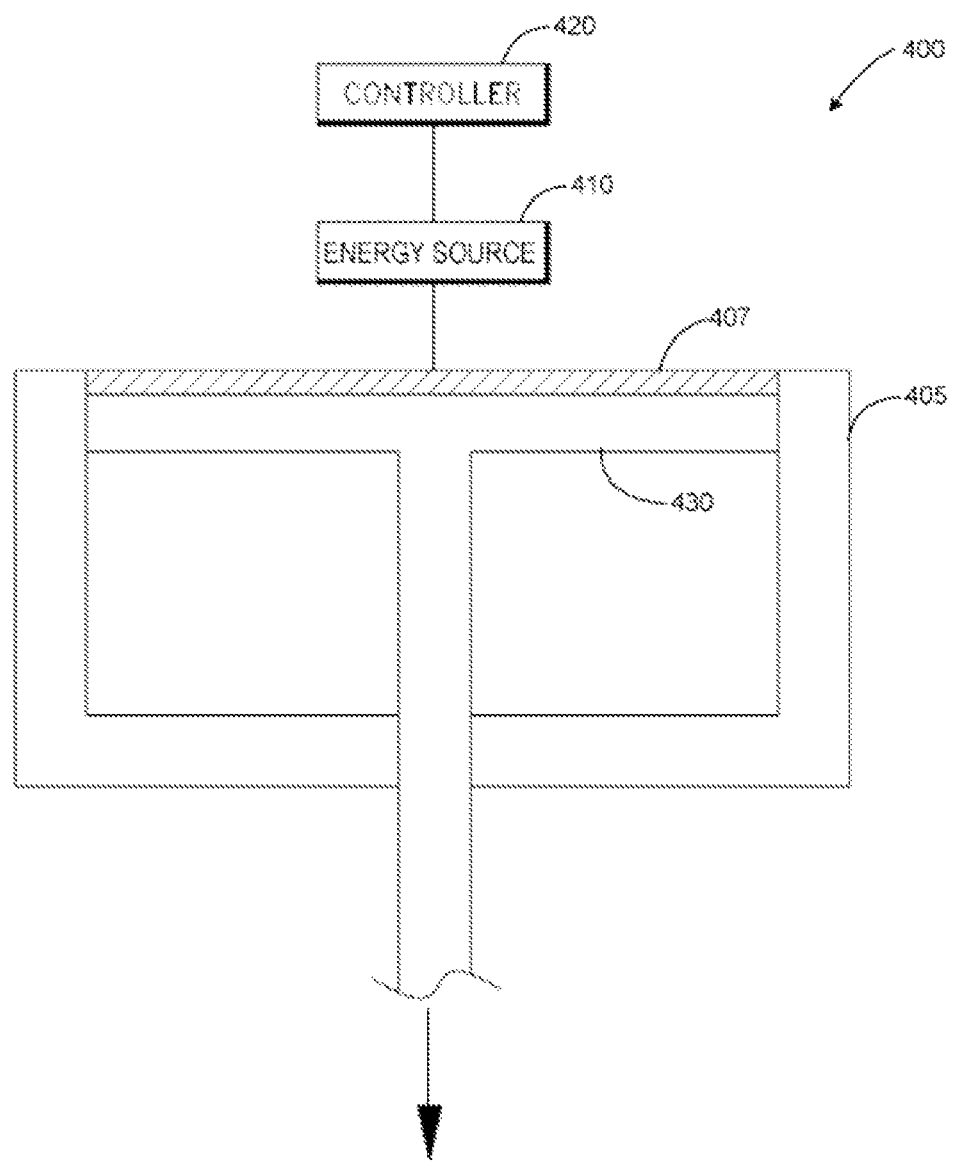
FIG. 4 is a schematic illustration of a 3D printing machine that may be used to perform the techniques disclosed herein according to one or more embodiments.

Using a process such as process 300 described in connection with the system and modules described in FIGS. 3A-3C, a 3D object may be manufactured using a 3D printing machine that implements one or more additive manufacturing techniques. FIG. 4 shows a schematic illustration of one example of a 3D printing machine 400 that may be used to perform the processes and/or techniques disclosed herein. In some embodiments, the 3D printing machine 400 corresponds to one of the additive manufacturing devices 106a or 106b illustrated in FIG. 1. The 3D printing machine 400 may be configured to perform selective laser sintering to generate a 3D object. The 3D printing machine 400 may include a vessel 405 of solidifiable material, such as a powder material 407. The powder material 407 includes a plurality of powder particles that are at least partially fused together when struck by an energy source 410, such as one or more computer controlled laser beams. The particles may be made of plastic powders, polymer powders, metal powders (direct metal laser sintering), ceramic powders, glass powders, or the like. The energy source 410 may be a programmable energy source that may be configured to apply different amounts of energy at different speeds and at different hatching distances to the powder material 407. For example, the energy source 410 may be a high power laser, such as a carbon dioxide laser. A controller 420 may control the energy source 410. In some embodiments, the controller 420 corresponds to the one of the computers 102a-102d illustrated in FIG. 1 and/or the processor 210 illustrated in FIG. 2. Those of skill in the art will recognize that, in some embodiments, the 3D printing machine 400 may also be configured to perform stereolithography or other additive manufacturing technique to generate a 3D object and that the vessel 405 may include any other type of solidifiable material, such as a liquid resin.

In some embodiments, a digital representation of the 3D object to be formed is input to the 3D printing machine 400. The digital representation of the 3D object may be automatically generated by the controller 420 and/or other hardware and/or software. The digital representations of the 3D object are divided into a series of cross-sectional layers which can be overlaid to form the object. Data representing the cross-sectional layers may be stored in one or more computer files. The controller 405 may use this data for building the object on a layer by layer basis. The cross-sectional layer data of the 3D object may be generated using a computer system and computer aided design and manufacturing (CAD/CAM) software.

The data files for the 3D object may be programmed or input into the 3D printing machine 400. A first layer of the powder material 407 may be deposited on a base plate 430. Based on the input data files, the 3D printing machine 400 may direct the computer controlled energy source 410 onto the surface of the first layer of the powder material 407 to generate a first cross-sectional layer of the 3D object. For example, a high power laser may be used to selectively fuse several of the particles of the layer together by sintering or welding the particles to create the first cross-sectional shape of the 3D object. The base plate 430 and the object may then be lowered to a depth corresponding to a desired thickness of the next cross-sectional layer of the object. A roller or other transport mechanism may cause a next layer of powder material 407 to be deposited from a reservoir (not shown) into the vessel 405 over the preceding object cross-sectional layer. The controller 420 may then apply the energy source 410 to the next layer of powder material 407 to generate the next cross-sectional layer of the 3D object. This process may be repeated until the build is complete and the object is generated.

Eyewear formed using the general additive manufacturing techniques described above generally use a pair of hinges to connect the front frame to the temples. Typically, the pair of hinges pivotally interconnects the front frame and the temples. Each hinge typically includes a tang, a clevis having a pair of spaced apart and generally parallel clevis members, and a pivot pin. The tang is provided with a pivot pin through hole and the clevis members are provided with a pair of axially aligned pivot pin through holes. The clevis members are placed around the tang, the through holes axially aligned and the connector pin is inserted into the aligned through holes to pivotally interconnect the tang and clevis. Conventionally, the pair of hinges is made in another material than the frame.

Figure 5:
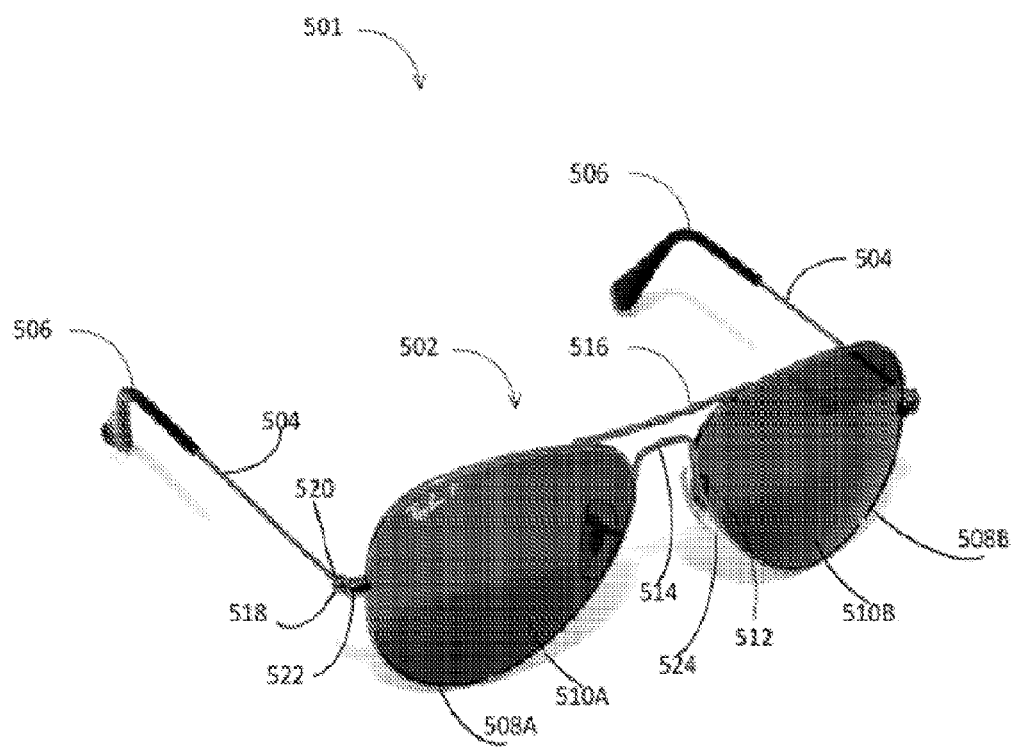
FIG. 5 is a graphical illustration of a basic pair of sunglasses.

Turning now to FIG. 5, eyeglasses 501 are shown to introduce conventional elements associated with eyewear frames. Notably, the eyewear frames of FIG. 5 are not manufactured using 3D printing technology and thus include a number of separate parts, often made of separate materials, which must be assembled to arrive at a finished eyewear frame. A front frame 502 is connected to two temples 504 with a hinge assembly 518. The hinge assembly 518 comprises a screw 520, which serves as a pivot. The hinge assembly 518 is connected directly to the end piece 522, which is directly connected to the frame rim. The left frame rim 508A holds the left lens 510A. The left frame rim 508A is connected to the right frame rim 508B by way of an optional sweatbar 516 and a bridge 514. The sweatbar 516 helps prevent perspiration from getting into a user's eye. Together, the sweatbar 516 and bridge 514 ensure that the left and right rims 508A, 508B stay in a fixed position during use. Also affixed to the rims 508A and 508B is a nosepad 524 that is secured to the frame rims with a pad arm 512. Extended contact and rubbing of the frame rim on the face and nose of the user can cause discomfort. The nose pad 524 provides a greater surface area, thus reducing the pressure on the user's face:

$$ssure = \frac{\text{Force}}{\text{Area}}.$$

Thus, pressure is inversely proportional to area. That is, the larger the surface area of the contact point, the lower the pressure on the user's face. In addition, the nose pad 524 may be made of a different material than the frame rim. The eyeglasses are further designed for comfort and utility in that the temples are equipped with temple tips 506, which may be made of a material that is different than that of the temple. This material may be softer to increase the user's comfort. Notably, traditional eyewear frames comprise numerous parts constructed from numerous materials, which limits design options and increases production costs.

Figure 6:
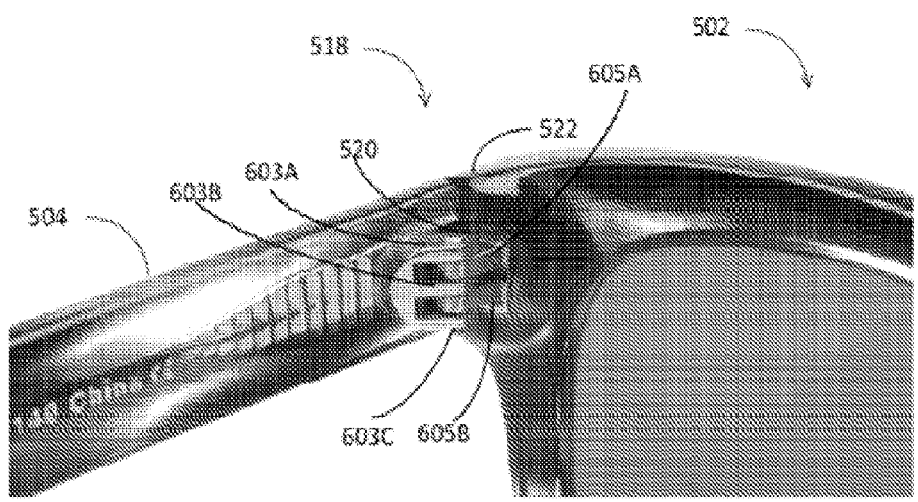
FIG. 6 is a graphical representation of the hinge system of a basic sunglasses.

Turning now to FIG. 6, the hinge 518 of FIG. 5 is shown in greater detail. Hinge 518 connects the temple 504 to the end piece 522. The hinge comprises tangs 605A and 605B that are interleaved between the devises 603A-C, which are parallel to one another, axially aligned and have through holes (not shown). The connector screw 520 is inserted into the aligned through holes to pivotally interconnect the tangs 605 and devises 603. This hinge 518 is a "barrel type" eyeglass hinge because it contains multiple tangs interleaved with devises. This hinge 518 allows for the temple to be opened in closed, with respect to the front frame 502.

As described above, these hinges are prone to breaking from the continual wear and tear caused by the opening and closing of the temples. For example, the fastener, whether it be a screw, pin, or bolt design, is subject to back-out after extended wear. When this occurs, the fastener will often be lost, and the product will be rendered useless until a repair is made. Moreover, the manufacture of eyewear frames having such hinges is costly due to the number of different materials utilized in construction.

The eyewear frames of the present invention overcome many of the deficiencies of prior art frames. By employing 3D printing technology, production costs are greatly reduced while enhancing design options. However, there are certain drawbacks to the manufacturing materials utilized for 3D printing. For example, the plastic material used in 3D printing technology can be quite brittle. A traditional hinge as illustrated in FIGS. 5 and 6 would break after a being removed and replaced on a user's head after repeated uses. Thus, an advantage of the 3D printed eyewear frames having a cross-spring hinge assembly, as will be described in greater detail below, is the ability of the eyewear frame to be folded without breaking. The cross spring hinge assembly provides performance that has heretofore been unachievable with the manufacturing material such as polyacrylamide.

In view of the above deficiencies, the inventors have recognized a need for 3D printed eyewear frames with integrated crossed spring hinges. As will be described in greater detail below, the integrated crossed spring hinge assemblies promote folding of a 3D printed eyewear frame without causing the frame to be stretched past 90 degrees, thus greatly reducing wear and plastic stretch. Moreover, the cross-spring hinge assemblies bias the temple orientation at an angle less than 90 degrees such that the 3D printed eyewear frame retains a snug fit relative to the user and does become overstretched, distorted, or overstressed such that the hinge would otherwise be prone to break.

To this end, novel and inventive systems and methods are presented herein. Using the inventive systems and methods, a user may also specify the type of integrated hinge to incorporate in an eyewear in accordance with one or more embodiments. This feature proves highly useful when using 3D printing because the user can customize a given eyewear to incorporate the ideal hinge that has the optimal properties of durability, performance and size needed for that given eyewear.

Figure 7A:
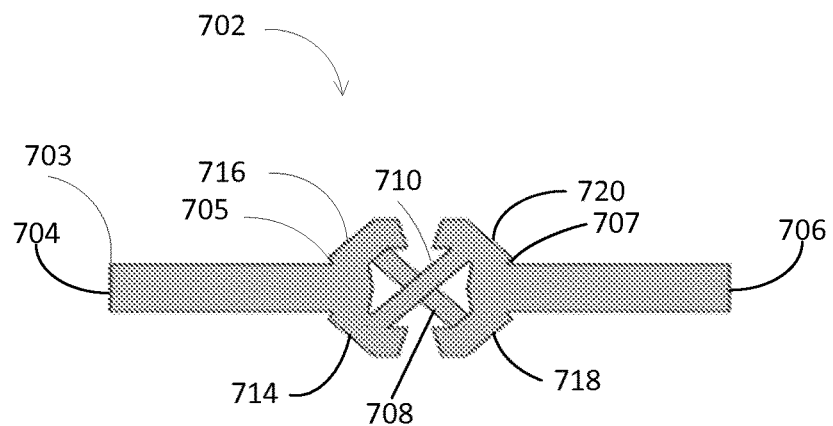
FIGS. 7A-7C provide a graphical representation of an eyewear hinge system which may be deployed in accordance with one or more embodiments.
Figure 7B:
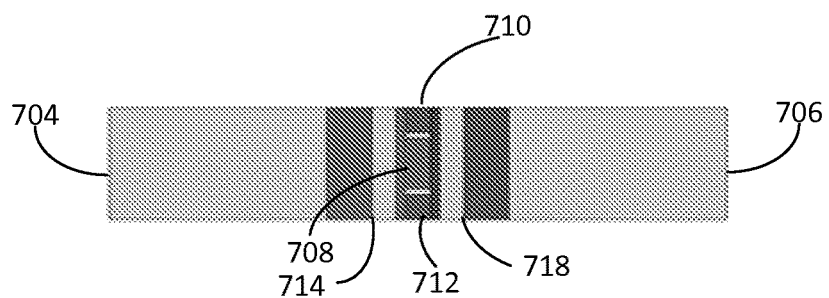
Figure 7C:
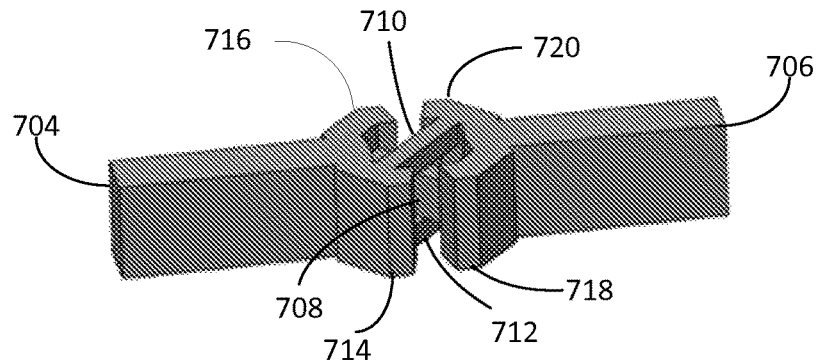

Turning now to FIGS. 7A-7C, a single crossed spring hinge 702 is shown. FIG. 7A shows a top-down view of the crossed spring hinge 702. The hinge 702 integrally connects the end piece 704 of a 3D printed eyewear frame to a temple 706 and allows for flex about the temple 706. End piece 704 has a proximal end 703 and a distal end 705. The end piece 704 is integrally attached to the front frame of the eyewear frame (not shown) at the proximal end 703. The distal end of the end piece has a posterior flange 716 and an anterior flange 714. The temple 706 likewise comprises a proximal end 707 and a distal end (not shown). At the proximal end 707 of the temple 706 is a second anterior flange 718 and a second posterior flange 720. Disposed between and integrally attached to the end piece 704 and temple 706 is the cross spring hinge having a first hinge leg 710 integrally attached to the anterior flange 714 of the end piece 704 and diagonally connected to the posterior flange 720 of the temple 706. The hinge assembly further comprises a second hinge leg 708 integrally attached to the anterior flange 716 of the end piece 704 and diagonally connected to the posterior flange 718 of the temple 706.

FIGS. 7B and 7C show a hinge assembly having a third hinge leg. FIG. 7B is a side view of a hinge assembly and shows a third hinge leg 712. FIG. 7C shows the third hinge leg 712 connected diagonally from the first anterior flange 714 to the second posterior flange 720. The diagonal positioning of the hinge legs 708 710 712 produces an X-shaped geometry. A skilled artisan will readily appreciate that the crossed spring hinge can be connected in a non-X-shaped geometry, such as in parallel; in addition to the fact that more or less than three legs may be used. For example, the hinge may have 1, 2, 3, 4, 5, 6, 7, 8, 9, 10, 11, 12, 13, 14, 15, 16, 17, 18, 19, or 20 legs. Legs 708 710 712 may be connected to each other or may be independent, able to move independently.

Figure 7D:
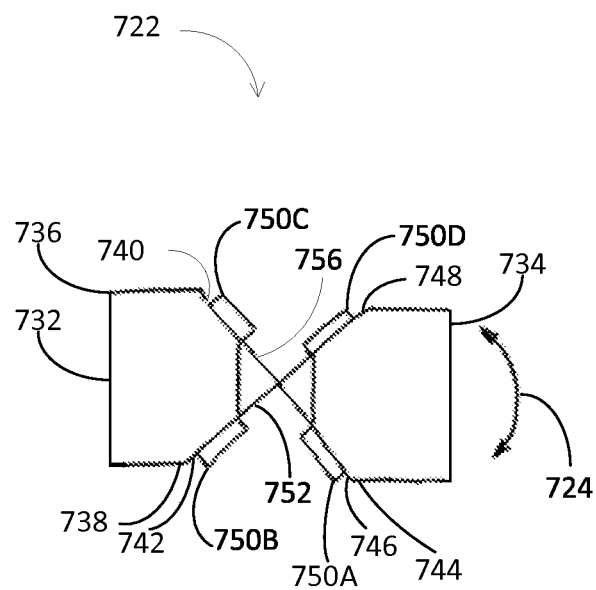
FIGS. 7D-7E provide a graphical representation of a crossed leaf rotary flexure eyewear hinge system which may be deployed in accordance with one or more embodiments.
Figure 7E:
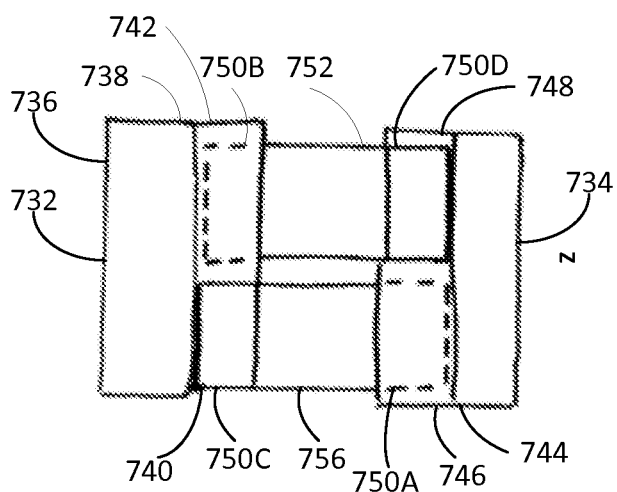

Turning now to FIGS. 7D-7E, a crossed leaf rotary flexure system 722 is shown. The crossed leaf rotary flexure comprises two or more cantilever flexures mounted at right angles to each other. In some projection views, the flexures may appear x-shaped. However, the two or more beams do not have to intersect or connect at any point. A crossed leaf rotary flexure may comprise a flexural pivot and allow for frictionless rotary motion, axis stiffness and resistance to parasitic motion. Flexural pivots, or hinges, are often used to multiply or to divide motion or force. The fact that this action is true multiplication or division and not just addition or subtraction, is significant, in that large accurate changes in travel or force can be made economically. This multiplication or division is accomplished by using fundamental leverage with flexural bearings as the pivots or fulcrums. Large very accurate ratios can be achieved by coupling multiple sections together with a series of frictionless, hysteresis-free flexural pivots. The crossed leaf rotary flexural system 722 may provide smooth rotary motion, as well as solid resistance to any attempt to twist it even the slightest amount, off its rotary axis.

A leaf flexure is a thin, flat, parallel plate, which is very flexible in comparison with the rest of the structure. Leaf flexures are used in assembled flexural systems. When using leaf flexures, one has to be careful not to incur large losses due to the poor coupling between the leaf flexures and the body of the flexural assembly. This poor coupling results from geometric distortions and burrs caused by mechanical machining or 3D printing. In the past, the quality of these usually thin, stiff structures was limited by the bending and burrs that were caused by the mechanical machining, 3D printing or metal stamping of the flexures. In modern machining practices, these thin parts may now be machined by Electrical Discharge Machining (EDM), where there is no physical contact, of any kind, between the machine and the flexure. Modern 3D printing technologies also allow for machining with no physical contact, of any kind, between the machine and the flexure. This process produces flexures of near perfect geometry, without any burrs or geometric distortions to hinder perfect coupling.

While in use, crossed leaf rotary flexural systems are sometimes subjected to parasitic movement. A parasitic movement is an unintended, undesirable, often off axis movement, of a flexural assembly. It is often, an off axis twisting movement, which imparts motion to the output of a flexural assembly, which did not exist in the original excitation. These parasitic motions can resolve as a first order and or, as a harmonic motion. The insertion of a dual axis flexure between the excitation and the flexural assembly, will attenuate or eliminate this problem. By adding a dual axis or toroidal flexure to the input and/or output, the actuating force may be applied on the central axis of the flexural assembly, so that near perfection in the energy transfer without parasitic movement is assured.

A two leaf flexure may be much more compact than a standard four bar flexure. The two parallel leafs effectively restrict the rotational mode at right angles to the blade that is characteristic of the single leaf cantilever flexure. The two leaf flexure may be much more prone to parasitic and off axis movement than the four bar flexure, but it may be far superior to mechanical pivots or hinges and it is compact, simple and inexpensive. As a true flexure, it has no friction, stiction or backlash. This device requires no lubrication, it has no hysteresis and can have an infinite life if it is properly mounted and not over loaded.

Alternatively, the flexural system 722 may take the form of a four bar flexural assembly. The four bar flexural assembly is one of the most widely used flexural designs for simple linear flexures. It consists of a fixed and mobile platform coupled together by four leaf type, or four double notched flexures. The transient platform of the four bar flexure will dip slightly as it is actuated. For the most accurate application the actuation and the output should be made on the centerline of the platforms at a position one half-way between the two platforms. To minimize parasitic and off axis rotation the actuation and the output of the four bar flexure, may be made through a decoupling mechanism such as the wobble pin or a multi axis flexure.

The flexural system 722 may also be a compound linear flexure. In a compound linear flexure, the elevation of the moving platform of a standard four bar flexural system may drop slightly when the platform is actuated. To correct for this drop, a second platform, with the same length flexures, is suspended under the first platform. When this second platform is actuated, it may raise up the same amount that the first platform drops down so the net result is perfectly linear motion. Particularly, for the second platform to provide truly linear motion, it may be necessary to be actuated at the center distance between the two platforms, by a decoupling mechanism such as a wobble pin, a dual axis notched flexure or a toroidal flexure.

Turning now to FIG. 7D, a side view of the crossed leaf rotary flexure system 722 is shown. The end piece 732 is connected to the temple 734 via the crossed leaf rotary flexure system 722. The crossed leaf rotary flexure system 722 allows for the smooth and frictionless actuating 724 of the temples with respect to the end piece 732. The hinge 722 integrally connects the end piece 732 of a 3D printed eyewear frame to a temple 734 and allows for flex 724 about the temple 734. End piece 732 has a proximal end 736 and a distal end 738. The end piece 732 is integrally attached to the front frame of the eyewear frame (not shown) at the proximal end 736. The distal end 738 of the end piece 732 has an anterior recess 740 and a posterior recess 742. The temple 734 likewise comprises a proximal end 744 and a distal end (not shown). At the proximal end 744 of the temple 734 is a second anterior recess 746 and a second posterior recess 748. Disposed between and integrally attached to the end piece 732 and temple 734 is the cross spring hinge 722 having a first hinge leg 752 integrally attached to the posterior recess 742 of the end piece 732 and connected to the posterior recess 748 of the temple 734. The hinge assembly 722 further comprises a second hinge leg 756 integrally attached to the anterior recess 740 of the end piece 732 and connected to the anterior recess 746 of the temple 734. The hinge leaf legs 752, 756 may be connected to the recesses at connection points 750A-D. Connection points 750A-D may be thicker than the hinge leaf legs 752, 756, as to ensure a stable connection and avoid parasitic movement, which is unintended, undesirable, often off axis movement, of the flexural assembly. The view of the hinge legs 752, 756 in the side view produces an X-shaped geometry. A skilled artisan will readily appreciate that the crossed spring hinge can be connected in a non-X-shaped geometry, such as in parallel; in addition to the fact that more than two legs may be used. For example, the hinge may have 1, 2, 3, 4, 5, 6, 7, 8, 9, 10, 11, 12, 13, 14, 15, 16, 17, 18, 19, or 20 legs. Legs 752, 756 may be connected to each other or may be able to move independently.

Turning now to FIG. 7E, a top-down view of the crossed leaf rotary flexure system 722 of FIG. 7D is shown. In this view, contact point 750B is hidden beneath the posterior end piece recess 742, and contact point 750A is hidden beneath anterior temple recess 746.

Figure 8A:
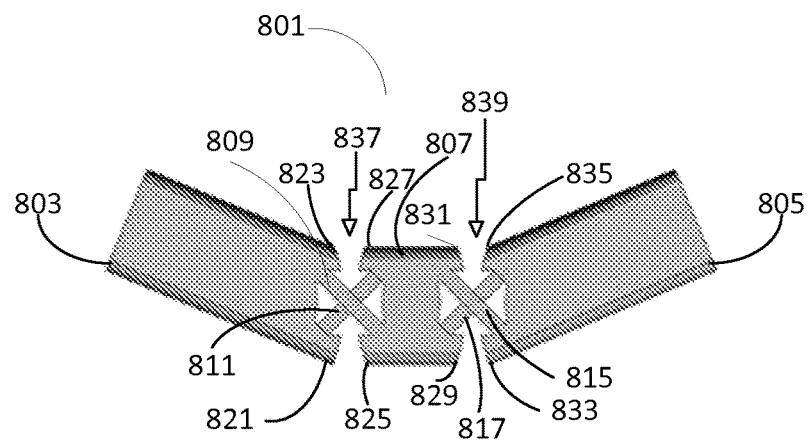
FIGS. 8A-8C provide a graphical representation of another eyewear hinge system which may be deployed in accordance with one or more embodiments.
Figure 8B:
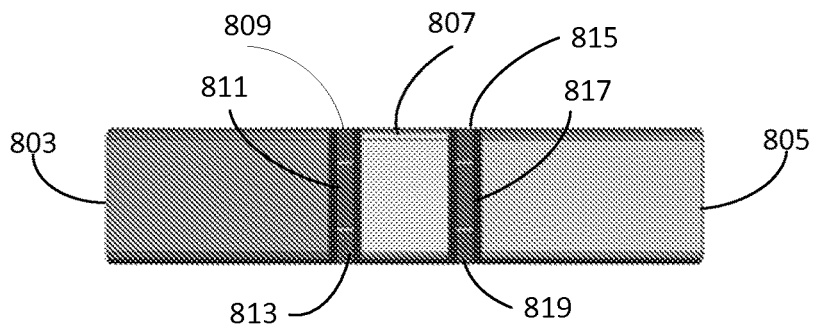
Figure 8C:
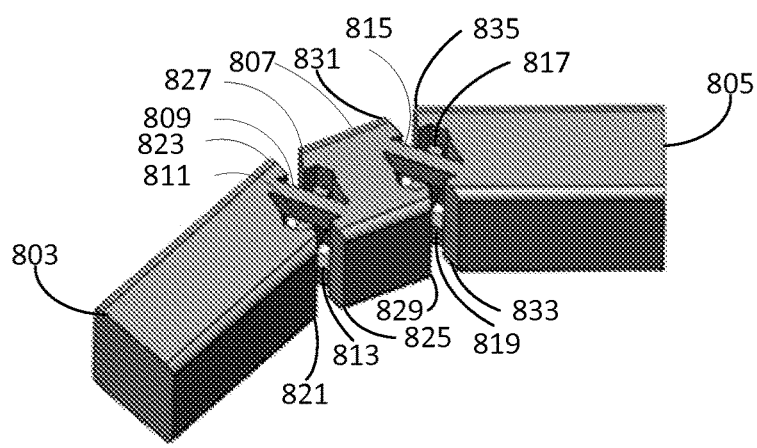

Turning to FIGS. 8A-8C, a hinge assembly having a plurality of crossed spring hinges in series 801 is shown. However, a skilled artisan will readily appreciate that the crossed springs could be oriented such that the crossed spring hinges are not in series e.g., in parallel. In FIG. 8A, an end piece 803 is connected to the temple 805 by a first crossed hinge spring 837, a passive connector 807, and a second crossed hinge spring 839. The hinge assembly 801 is disposed between the end piece 803 and the temple 805. The end piece 803 has an anterior end piece flange 821 and a posterior end piece flange 823. The temple 805 has an anterior temple flange 833 and a posterior temple flange 835. The passive connector 807 has a first anterior connector flange 825, a first posterior connector flange 827, a second anterior connector flange 829, and a second posterior connector flange 831. A first hinge leg 809 is connected diagonally from the posterior flange 823 to the first anterior connector flange 825. A second hinge leg 811 is diagonally connected from the anterior end piece flange 821 to the first posterior connector flange 827. On the other side of the passive connector 807, a third hinge leg 815 is connected diagonally from the second posterior connector flange 831 to the anterior temple flange 833. And a fourth hinge leg 817 is connected diagonally from the second anterior connector flange 829 to the posterior temple flange 835. In FIG. 8B, a fifth hinge leg 813 and sixth hinge leg 819 are shown. In FIG. 8C, fifth hinge leg 813 is shown connected diagonally from the posterior end piece flange 823 to the first anterior connector flange 825. In addition, a sixth leg 819 is connected diagonally from the second posterior connector flange 831 to the anterior temple flange 833. In this embodiment, the passive connector 825 helps contribute to the flexibility of the hinge.

Figure 9A:
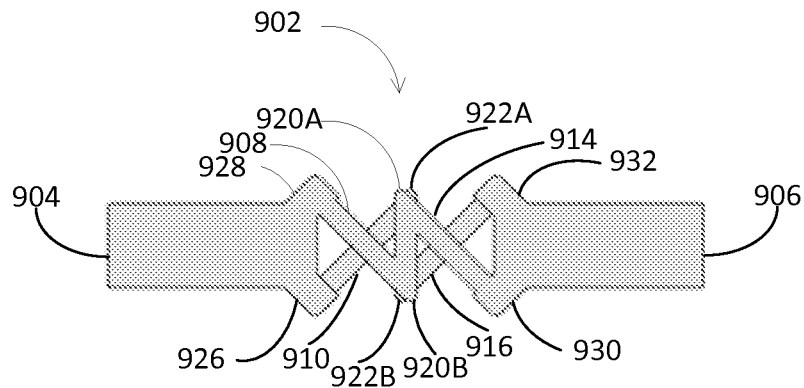
FIGS. 9A-9C provide a graphical representation of yet another eyewear hinge system which may be deployed in accordance with one or more embodiments.
Figure 9B:
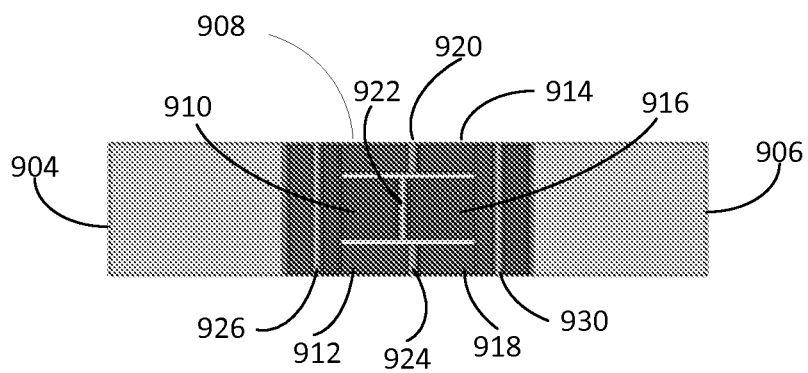
Figure 9C:
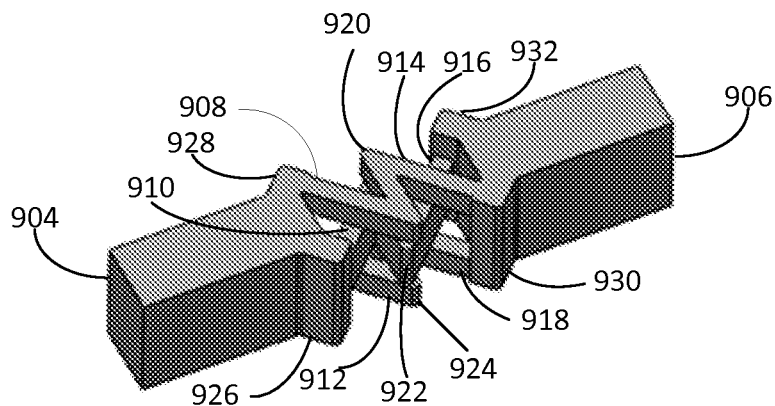

Turning now to FIG. 9, another system of two crossed spring hinges in series 902 is shown. In this system, the crossed spring hinges are immediately adjacent, with no discrete connector. The end piece 904 is connected to the temple 906 by the system of two crossed spring hinges in series 902. The end piece 904 has an anterior end piece flange 926 and a posterior end piece flange 928. The temple 906 also has an anterior temple flange 930 and a posterior temple flange 932. A first spring leg 910 is connected diagonally from the posterior end piece flange 928 to the anterior of an upper center bar 920B. The posterior of the upper center bar 920A is connected to the anterior temple flange 930 by a second spring leg 914. A third spring leg 908 is connected diagonally from the anterior end piece flange 926 to the posterior of a middle center bar 922A. The anterior of the middle center bar 922B is connected to the posterior temple flange 932 by a fourth spring leg 916. FIG. 9B shows a section of the lower portion of this spring system 902, namely fifth spring leg 912, the anterior of the lower center bar 924, and sixth spring leg 918. FIG. 9C shows yet a different view of the lower portion of this spring system, namely sixth spring leg 912 connected diagonally from the posterior end piece flange 928 to the anterior of the lower center bar 924. A posterior of the lower center bar (not shown) is connected to the anterior temple flange 930 by sixth spring leg 918.

In another aspect, the 3D printed eyewear frames with an integrated crossed spring hinge assembly may optionally include a locking feature. The locking feature comprises a securing element which secures the temples of the eyewear frames in a closed position. Exemplary securing elements may include an incision at the distal end of at least one of a temple, whereby the incision defines an aperture by which the opposing temple can be inserted into the incision/aperture to secure the temples in a closed position. In an alternative embodiment, the securing element is an anchor affixed to the distal end of a temple, wherein the distal end of the opposing temple can interact with the anchor to secure the temples in a closed or locked position. In yet another example, the securing element may include a hook on the distal end of a temple, whereby the opposing temple can be secured.

Figure 10A:
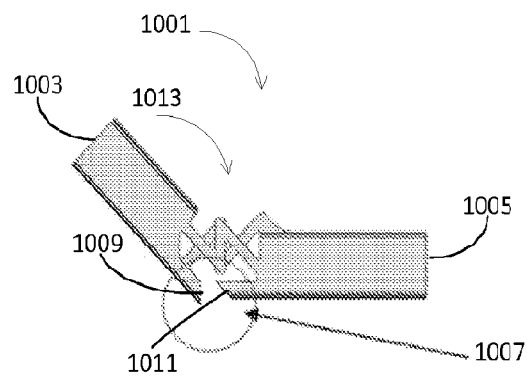
FIGS. 10A-10C provide a graphical representation of an eyewear hinge system having a range limiter which may be deployed in accordance with one or more embodiments.
Figure 10B:
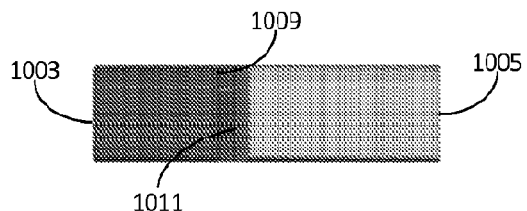
Figure 10C:
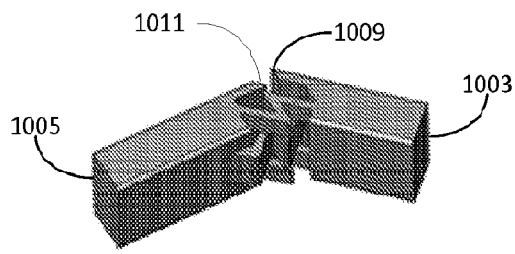

Turning to FIGS. 10A-10C, a hinge system 1001 with a range of mobility limiter 1007 is shown. This range limiter 1007 may serve to prevent overstretching and resulting damage. FIG. 10A shows an end piece 1003 connected to a temple 1005 with immediately adjacent crossed spring hinges 1013, in contrast to the hinge assembly in FIGS. 8A-8C. FIGS. 10A-10C differ from FIGS. 8A-8C in that there is no discrete connector between the hinges. The range of mobility limiter 1007 operates by using the anterior flange of the end piece 1009 and the anterior flange of the temple 1011. When the temple is opened, with respect to the end piece, past a predefined distance, the anterior flange of the end piece 1009 and the anterior flange of the temple 1011 meet and prevent any further motion in that direction. At this point, the user may feel the resistance of the legs, indicating that the temples should not be forced. Typically, the mobility limiter 1007 prohibits extension of the temples at an angle greater than about 90, 95, 100, 105, 110, 115, 120, 125, or greater degrees relative to the integrated front frame. In some aspects, the mobility limiter 1007 limits extension of the temples at an angle of 110 degrees relative to the integrated front frame. FIG. 10B is a side view of the hinge system 1001. FIG. 10C is an aerial view of the hinge system 1001 that shows how the flanges are fitted to be flat to ensure optimal mating.

Figure 11A:
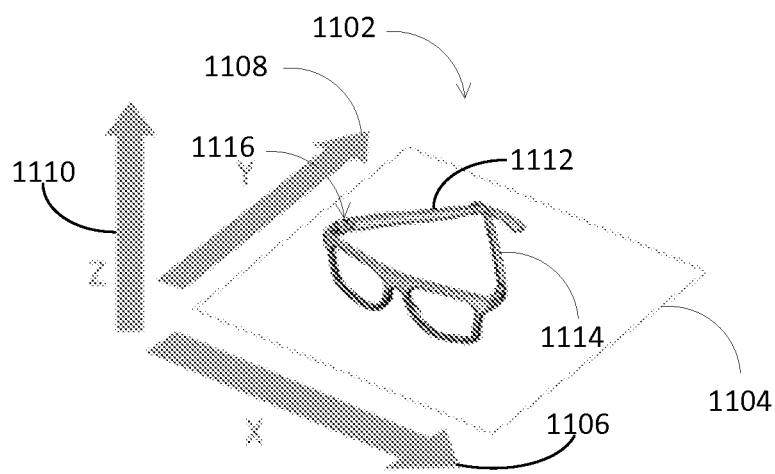
FIGS. 11A-11B provide a graphical representation of a building position of eyewear which may be deployed in accordance with one or more embodiments.

A method of manufacturing an eyewear frame having a crossed spring hinge assembly is likewise provided. Turning now to FIG. 11A, the building orientation of eyewear 1102 is shown. An x-axis 1106, a y-axis 1108 and a z-axis 1110 is also shown. The hinge 1116 may be produced in a building orientation in which the plane formed by the x-axis and the y-axis, the XY plane 1104, of the 3D printing machine is parallel with the two-dimensional plane formed by the temples 1112 and 1114. This building position may allow for optimal construction of the eyewear frame. Because of the gravitational forces acting upon the eyewear while it is being manufactured, it is important that the eyewear be built in a position that allows it to not deform. The platform generation module may provide functionality which allows a user to prepare the platform for the manufacturing process by orienting the eyewear in an optimized way via nesting and other platform optimization techniques.

Figure 11B:
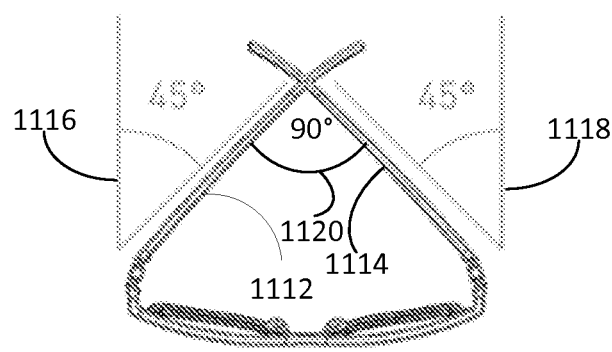

In FIG. 11B, a building orientation of the temples 1112 1114 is shown. The angle 1120 formed by the intersection of the temple 1112 and temple 1114 is about 90°. In other words, the angle formed by the parallel lines 1116 and 1118 with respect to the legs 1112 and 1114 is 45°, respectively. A skilled artisan will appreciate that this angle may range from 5°, 10°, 15°, 20°, 25°, 30°, 35°, 40°, 50°, 55°, 60°, 65°, 70°, 75°, 80°, 85°, and 90°. The building angle sets the initial bias, or rest position, of the temples. When the temples are biased at 45°, the temples exert an outward force when closed, and an inward force when worn. This inward force may be exerted on the side of the user's head due to the fact that the temples must be opened past 45° in order to put the eyewear on. This extra force may help secure the eyewear on the user's head. Keeping the eyewear secure may help prevent the eyewear from shaking, falling, and/or breaking. This feature is particularly useful when the user is engaged in sports, recreational or fast-paced activities.

Figure 12:
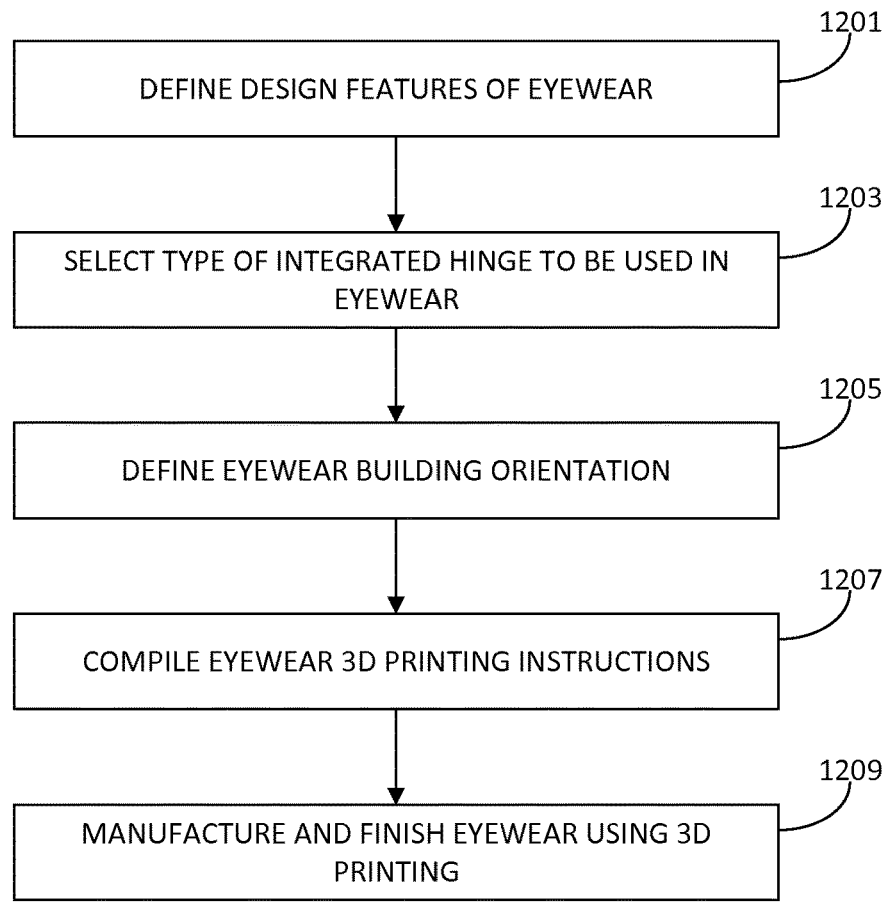
FIG. 12 is a flowchart depicting an example of a method of eyewear design and manufacture in accordance with one or more embodiments.

In certain embodiments, systems and modules such as those described above may be configured to perform a method of designing and manufacturing of 3D printed eyewear frames with integrated hinges. Turning now to FIG. 12, a flowchart of a high level view of such a process is provided. In some embodiments, the process may be carried out by a support module or computer aided design/manufacturing (CAD/CAM) software. Alternatively, and depending upon the specific implementation environment, the process may be carried out by some other module in an additive manufacturing system. For example, the process may be performed on an application server which is accessed by a client application (such as an application run through a web browser) to receive data inputs and complete the design of the 3D printed eyewear based in data received via a computer network.

The process begins at block 1201, where the design features of the eyewear are defined. This may accomplished in a variety of ways. In some embodiments, a predefined eyewear design may be generated. This design may be set by default by a 3D design module, the 3D data preparation and STL editing module, the 3D manufacturing and build module, or it may be modified by the user. The default may be based upon the physical properties materials used and the additive manufacturing process employed. Alternatively, the design may be determined manually by the user and inputted via a graphical user interface.

The process may then move to block 1203, where the type of integrated hinge to be used in the eyewear is selected. In some embodiments, the eyewear hinge may be automatically selected. However, the user may be permitted to modify the selected design via a graphical user interface. In other embodiments, the right hinge may be of a different type than the left hinge on the eyewear. In yet another embodiment, the eyewear may comprise more than two hinges. The eyewear may comprise 1, 2, 3, 4, 5, 6, 7, 8, 9, 10, 11, 12, 13, 14, 15, 16, 17, 18, 19 or 20 hinges. A skilled artisan will understand that all the hinges need not be of the same type. The hinges may be selected from a group comprising: (1) at least one crossed spring hinge comprising one or more legs; (2) at least two crossed spring hinges in parallel; (3) at least two crossed spring hinges in series connected by, or separated by, a connective element or passive connector; and (4) at least two crossed spring hinges immediately adjacent in series.

The process then moves to block 1205, where the eyewear building orientation is defined. In some embodiments, a default building orientation may be provided by a 3D design module, a 3D data preparation and STL editing module, or a 3D manufacturing and build module. In other embodiments, the building orientation may be selected by the user using a graphical user interface. Next the process moves to block 1207, where the eyewear 3D printing instructions are compiled. In some embodiments, the 3D printing instructions may be compiled by the 3D manufacturing and build module.

Once the instructions are compiled, the process may move to block 1209, where, using 3D printing, the eyewear may be manufactured and finished. Various embodiments may provide more efficient and cost-effective removal during the finishing process. Finishing comprises a broad range of processes that are practiced by most industries which manufacture metal and non-metallic parts. Typically, manufacturers perform the finishing after a part has been formed. Finishing can be any operation or industrial process that alters the surface of a workpiece to achieve a certain property. Common finishes include paint, lacquer, ceramic coatings, and other surface treatments. Finishing processes may be employed to improve appearance, adhesion, wettability, solderability, corrosion resistance, tarnish resistance, chemical resistance, wear resistance, hardness, modify electrical conductivity, remove burrs and other surface flaws, and control the surface friction. At this stage, the finishing operations (if any) may be performed to produce a final manufactured device.

Figure 13:
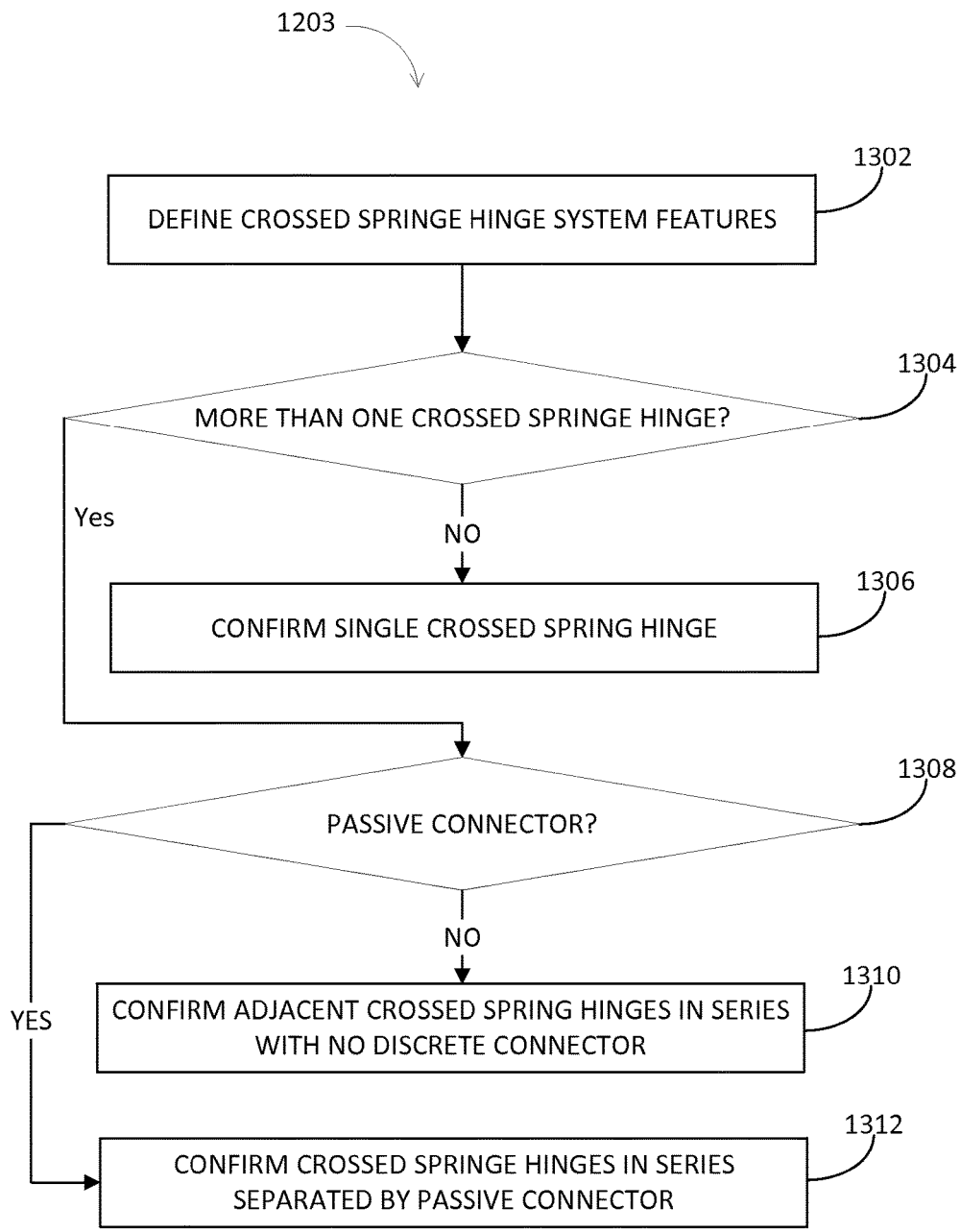
FIG. 13 is a flowchart of a sub process showing a more detailed view of the selection of a hinge in accordance with one or more embodiments.

FIG. 13 is a flowchart providing a more detailed view of the selection of the type of integrated hinge to be used in the eyewear 1203 of FIG. 12. In this process, the parameters and features of the hinge are determined. The process begins at block 1302, where the crossed spring hinge system features are defined. In some embodiments, the parameters are predetermined by a 3D design module. In other embodiments, the parameters are user-defined by a graphical user interface provided by the 3D design module. The parameters may comprise features such as aesthetics, flexibility, durability, safety, tensile strength, compression/compressive strength, shear strength, yield strength, ductility, creep, permeability, magnetism, diamagnetism, paramagnetism, reflectivity, thermal conductivity, flammability, acoustical absorption, hardness, coefficient of friction, coefficient of restitution, and surface roughness. Next, the process moves to decision block 1304, where it is determined whether the hinge system will have more than one crossed spring hinge. If the hinge system will only have one crossed spring hinge, the process moves to block 1306, where the use of a single crossed spring hinge is confirmed (such as, for example, the hinge in FIGS. 7A-7C).

Returning to block 1304, if the hinge system has more than one crossed spring hinge, the process moves to decision block 1308. There, the decision may be made as to whether or not the hinge system will comprise a passive connector. If no passive connector is selected, the process moves to block 1310, where adjacent crossed spring hinges in series with no discrete connector are confirmed. Returning to block

1308, if a passive connector is selected, the process moves to block 1312, where crossed spring hinges in series separated by a passive connector are selected.

Embodiments of the present invention provide various different solutions for designing and manufacturing 3D printed eyewear. These various configurations provide advantages such as providing hinges, fully integrated without the need for screws, pins, or bolts, for eyewear frames. In addition, the present invention provides the possibility to open and close the eyewear repeatedly without damaging the frame. The present invention provides durable flexibility: the combination of building orientation, relative position of the temples, and the presence of cross hinges avoids the build-up of excessive stresses in certain zones. Absence of local stress results in a longer lifetime for the eyewear. Another advantage of the present invention is the comfort (tight fit & stability) when wearing the eyewear. In an 'open' position, the crossed hinges produce a predetermined angle e.g., 45°, providing some inward moving forces, so that the eyewear frame is held tightly against the user's head.

Another advantage of the present invention is the ease of folding together of the frame, and storing it in a case. A predetermined angle ensures that no excessive force is needed to fold the temples inward. As the folded position is not the equilibrium position, some force may be needed to keep the legs in the folded position. An additional securing feature may help to maintain this position. Another advantage of the present invention is the economically viable production of the eyewear. Yet another advantage of the present invention is the fact that the eyewear hinges may be made of same material as the frame by the same production technology, and are integrally connected to the frame. Producing 3D printed eyewear hinges made of the same material as the rest of the frame is particularly challenging due to the limited availability of elastic materials.

The invention disclosed herein may be implemented as a method, apparatus, or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, FPGAs, ASICs, complex programmable logic devices (CPLDs), programmable logic arrays (PLAs), microprocessors, or other similar processing devices.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An eyewear frame made using a 3D printing process, said frame comprising:
   a front frame;
   an end piece integrally attached to said front frame;
   at least one temple integrally attached to said end piece; and
   at least one crossed-spring hinge disposed between said end piece and said temple, the crossed-spring hinge connecting the end piece with the temple, wherein the crossed-spring hinge comprises a first hinge leg and a second hinge leg, wherein said first and second hinge leg form a crossed leaf rotary flexure, wherein the eyewear frame is a 3D printed eyewear frame wherein the at least one crossed-spring hinge is integrated.

2. The eyewear frame of claim 1, wherein the frame is constructed of a material selected from the group consisting of polyurethane, polyamide, polyamide with additives such as glass or metal particles, blockcopolymers, resorbable materials such as polymer-ceramic composites, aluminium, cobalt chrome, stainless steel, maranging steel, nickel alloy, titanium, alumide carbonmide, polyethylene, polyethylene block amides, polyesters, polyvinyl chloride, polylactic acids, epoxies, (meth)acrylates, polypropylene, thermoplastic polyurethane, acrylonitrile butadiene styrene (ABS), polycarbonate (PC), polycarbonate acrylonitrile butadiene styrene, methyl methacrylate-acrylonitrile-butadiene-styrene copolymer, polyacrylamide, polystyrene, polyoxymethylene (POM).

3. The eyewear frame of claim 1, wherein the eyewear frame includes a locking feature, the locking feature comprises a securing element which secures the at least one temple of the eyewear frame in a closed position.

4. The eyewear frame of claim 3, wherein the securing element is selected from a group consisting of an anchor, an incision, and a hook.

5. The eyewear frame of claim 1, wherein the at least one temple is biased at an angle of less than 90 degrees with respect to the front frame.

6. The eyewear frame of claim 1, wherein the at least one temple is biased to an in-rest position between 30 degrees and about 45 degrees with respect to the front frame.

7. The eyewear frame of claim 1, wherein the eyewear frame further comprises a range limiter, wherein said range limiter prevents the opening of said at least one temple at an angle greater than a predefined angle with respect to the front frame.

8. The eyewear frame of claim 1, wherein the first and second hinge legs produce an X-shaped geometry.

9. The eyewear frame of claim 1, wherein the first hinge leg is diagonally connected to at least one posterior flange of the at least one temple, and the second hinge leg is diagonally connected to the at least one posterior flange of the at least one temple.

10. The eyewear frame of claim 9, wherein the first hinge leg is integrally attached to at least one anterior flange of the end piece, and the second hinge leg is integrally attached to at least one anterior flange of the end piece.

11. The eyewear frame of claim 1, wherein the crossed-spring hinge comprises a third hinge leg, wherein said first and third hinge legs are in parallel.

12. A method of manufacturing eyewear, said method comprising:
   defining design features of said eyewear, the eyewear including an eyewear frame comprising:
      a front frame;
      an end piece integrally attached to said front frame;
      at least one temple integrally attached to said end piece; and
      at least one crossed-spring hinge disposed between said end piece and said temple, the crossed-spring hinge connecting the end piece with the temple, wherein the crossed-spring hinge comprises a first hinge leg and a second hinge leg, wherein said first and second hinge leg form a crossed leaf rotary flexure, wherein the at least one crossed-spring hinge is integrated;

selecting the type of integrated cross-spring hinge to be used in said eyewear;
defining a building orientation for the eyewear;
compiling 3D printing instructions for said eyewear;
manufacturing and finishing said eyewear using 3D printing technology in the building orientation.

13. The method of claim 12, wherein the crossed spring hinge is produced in the building orientation in which a plane formed by an x-axis and a y-axis of a 3D printing machine is parallel with a two-dimensional plane formed by two of the at least one temple.

14. The method of claim 12, wherein the eyewear frame is constructed of at least one of the following materials: polyurethane, polyamide, polyamide with additives such as glass or metal particles, resorbable materials such as polymer-ceramic composites, aluminium, cobalt chrome, stainless steel, maranging steel, nickel alloy, titanium, alumide and carbonmide.

15. The method of claim 12, wherein the eyewear frame includes a locking feature, the locking feature comprises a securing element which secures the at least one temple of the eyewear frame in a closed position.

16. The method of claim 12, said method further comprising:
defining at least one feature of the crossed spring hinge system;
determining if more than one crossed spring hinge is to be used;
determining if a passive connector is to be used.

* * * * *